United States Patent
Anderson et al.

(10) Patent No.: US 10,504,310 B2
(45) Date of Patent: Dec. 10, 2019

(54) TECHNIQUES FOR ACCESS CONTROL USING WEARABLE DEVICES

(71) Applicant: INTEL CORPORATION, Santa Clara, CA (US)

(72) Inventors: Glen J. Anderson, Beaverton, OR (US); Justin M. Reina, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 133 days.

(21) Appl. No.: 15/640,964

(22) Filed: Jul. 3, 2017

(65) Prior Publication Data

US 2017/0372539 A1 Dec. 28, 2017

Related U.S. Application Data

(63) Continuation of application No. 14/582,982, filed on Dec. 24, 2014, now Pat. No. 9,697,657.

(51) Int. Cl.
*G07C 9/00* (2006.01)
*G06K 19/073* (2006.01)
(Continued)

(52) U.S. Cl.
CPC ... *G07C 9/00031* (2013.01); *G06K 19/07381* (2013.01); *G07C 9/00103* (2013.01); *G07C 9/00119* (2013.01); *A45F 2005/002* (2013.01); *A45F 2005/008* (2013.01); *G08B 21/0286* (2013.01)

(58) Field of Classification Search
None
See application file for complete search history.

(56) References Cited

U.S. PATENT DOCUMENTS

| | | |
|---|---|---|
| 2003/0005193 A1 | 1/2003 | Seroussi et al. |
| 2003/0173408 A1 | 9/2003 | Mosher et al. |

(Continued)

FOREIGN PATENT DOCUMENTS

| | | |
|---|---|---|
| CN | 1598875 A | 3/2005 |
| CN | 1610920 A | 4/2005 |

(Continued)

OTHER PUBLICATIONS

European Search Report for the European Patent Application No. 15874091, dated Aug. 1, 2018.

*Primary Examiner* — Daniell L Negron

(57) ABSTRACT

Various embodiments are generally directed to techniques for using little or no electric power to monitor whether a wearable device continues to be worn by a person such that it may continue to be used to access a secured item. An apparatus may include a processor component; a storage to store an access credential; a presentation component to wirelessly transmit the access credential to an access device to enable a grant of access to a secured item; a power source; and a clasp coupled to a wearable portion to prevent removal of the wearable portion unless the clasp is operated to change state from a clasped state to an unclasped state, the clasp to cause loss of electric power from the power source to the processor component and the storage when in the unclasped state to nullify the access credential. Other embodiments are described and claimed.

25 Claims, 13 Drawing Sheets

(51) Int. Cl.
  *G08B 21/02* (2006.01)
  *A45F 5/00* (2006.01)

(56) References Cited

U.S. PATENT DOCUMENTS

| | | |
|---|---|---|
| 2006/0049266 A1 | 3/2006 | Nakajima |
| 2007/0120687 A1 | 5/2007 | Lerch et al. |
| 2015/0028996 A1* | 1/2015 | Agrafioti ................. G06F 21/40 340/5.82 |

FOREIGN PATENT DOCUMENTS

| | | |
|---|---|---|
| CN | 1639726 A | 7/2005 |
| CN | 1949197 A | 4/2007 |
| CN | 101655916 A | 2/2010 |
| CN | 103116926 A | 5/2013 |

\* cited by examiner

TECHNIQUES FOR ACCESS CONTROL USING WEARABLE DEVICES

BACKGROUND

This application is a continuation of, claims the benefit of, and claims priority to U.S. patent application Ser. No. 14/582,982 filed on Dec. 24, 2014, the subject matter of which is incorporated herein by reference in its entirety.

BACKGROUND

The use of various login procedures to secure access to computing devices, vehicles and rooms within buildings continues to become more prevalent. Among the most prevalent of such login procedures are passwords typed at keypads or keyboards. However, as well known to those skilled in the art, passwords have increasingly proven to be fraught with issues from so-called "weak" passwords (passwords that are easily guessed such as "1234" or "admin"), to instances of password users forgetting their passwords, and to instances of even so-called "strong" passwords (passwords that cannot be easily guessed) becoming compromised as a result of having been written down or shared with another person. More broadly, password users often find the use of passwords to be annoying, and have been known to take any of a number of actions to get around using them.

Among the alternatives to the use of passwords for login procedures that have started to become more prevalent are access cards and fobs that can simply be presented to an access device associated with the computing device, vehicle or room to which access is sought. Access cards and fobs may eliminate the need for personnel to remember a password and may reduce instances of sharing access with another person. However, access cards and fobs can still enable sharing of access among multiple persons, since an access card or fob can still be physically passed between persons.

Still other alternatives to further curtail sharing may include the use of biometrics, such as fingerprints, voice identification and/or retinal blood vessel pattern scanning as a basis of a login procedure. Such features of a person's body are known to be unique to each person and cannot be transferred between them. However, difficulties may be encountered in using such biometrics to recurringly or continuously confirm the person currently making use of access to a computing device, a vehicle or a room of a building is still the same person to whom access was originally granted based on biometric login procedure.

DETAILED DESCRIPTION

Figure 1:
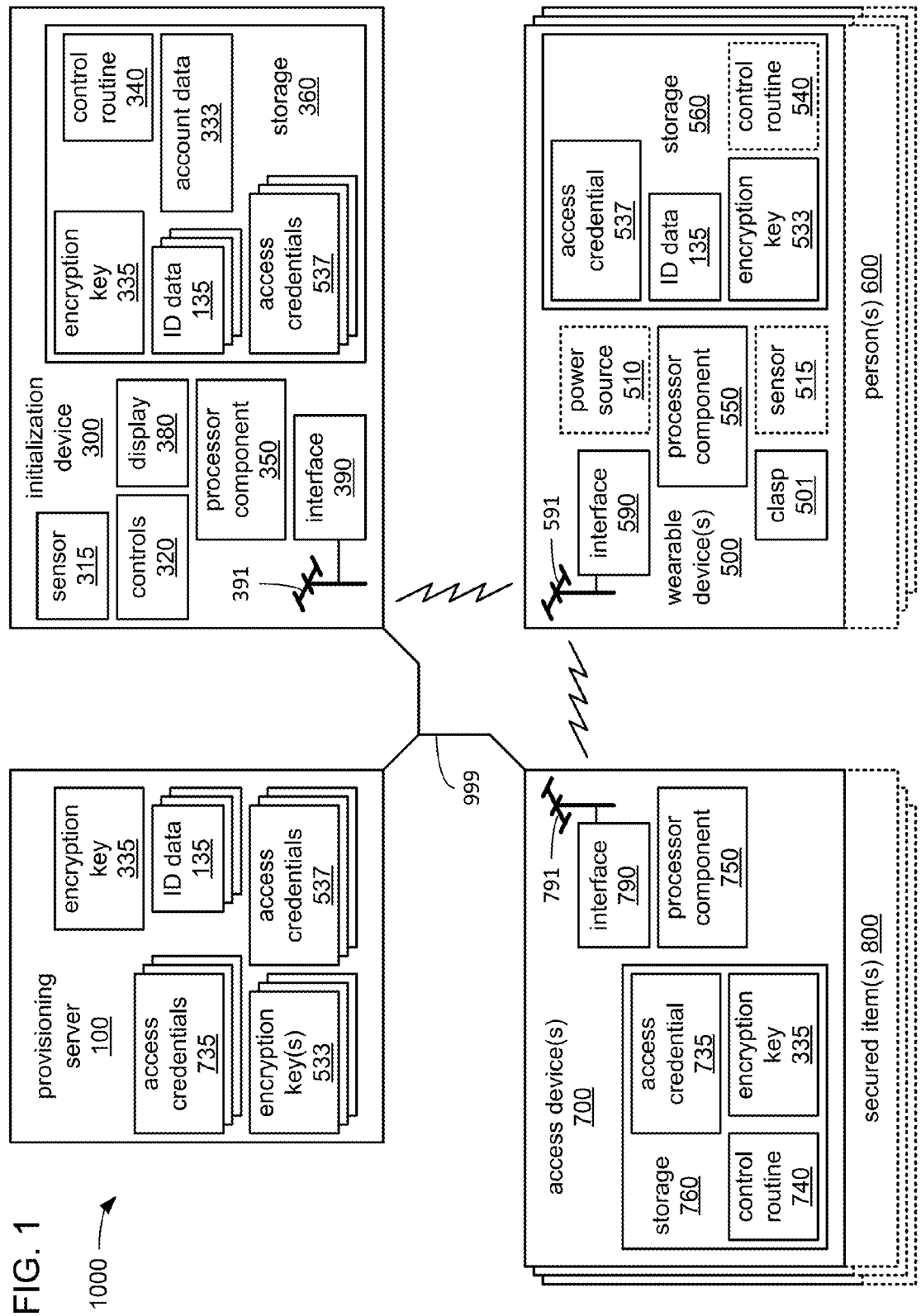
FIG. 1 illustrates an example embodiment of an access control system.

Various embodiments are generally directed to techniques for using little or no electric power to monitor whether a wearable device assigned to a particular person continues to be worn by that person such that it may continue to be used to obtain a grant of access to a secured item. An initialization device initially verifies the identity of that person and verifies that the wearable device is currently worn by that person before providing the wearable device with an access credential that can be used to gain access to one or more secured items as long as that person continues to wear the wearable device from the time that the access credential is provided thereto. The wearable device continuously monitors whether or not it continues to be worn by that person and acts to nullify the access credential given to it by the initialization device in response to detecting that it has ceased to be worn by that person.

The wearable device may be physically shaped and sized to be worn about a portion of a person's body in a manner that prevents its removal from that portion of the person's body without undoing at least one clasp of the wearable device. By way of example, the wearable device may be a bracelet shaped and sized to be worn about a wrist or ankle, and may include a clasp that must be undone to enable removal from that wrist or ankle. During use of the wearable device, it may be provided with an access credential by an initialization device, and may store that access credential for use in enabling the person wearing the wearable device to gain access to an item secured by an access device through wireless communications with that access device. The items that may be so secured may include, and are not limited to, a computing device, a vehicle, a weapon or a room of a building.

At least following provision of the access credential by the initialization device, the wearable device may continuously monitor its status to confirm that it is still worn by the person to which it is assigned. In response to an undoing of its clasp, the wearable device may nullify the access credential provided to it by the initialization device such that the access credential can no longer be used with an access device to gain access to a secured item. Such nullification of the access credential may be effected by erasing it, modifying it in a manner that corrupts it, or marking it in a manner that provides an indication that the clasp was earlier undone such that it can no longer be relied upon. By continuously monitoring the status of the clasp and nullifying the access credential upon detection of undoing of the clasp, the wearable device ensures that the wearable device becomes useless as a mechanism for gaining access to a secured item through an access device once the wearable device ceases to be worn by the person to which it was assigned.

In some embodiments, the clasp may incorporate electrical contacts that are caused to cooperate to make and/or break an electrical circuit when the clasp is operated to be in either a clasped or unclasped state. Alternatively or additionally, the clasp may incorporate or be otherwise associated with an electrical switch that makes and/or breaks an electrical circuit depending on whether the clasp is operated to be in either a clasped or unclasped state. Through such use of electrical contacts and/or an electrical switch, electric power may be applied and/or removed from a circuit in a manner causing erasure or corruption of the access credential and/or marking of the access credential to nullify it in response to the clasp being operated to an unclasped state that enables the wearable device to be removed from a portion of the body of the person to which the wearable device is assigned. The electric power may be provided by a battery and/or other power source incorporated into the wearable device, and the circuit(s) incorporated into the wearable device may be selected to store the access credential and continuously monitor the state of the clasp in a manner that minimizes consumption of electric power. As a result, in embodiments incorporating a battery, the battery may last a relatively lengthy period of time (e.g., one or more years) so as to not require replacement and/or recharging.

Alternatively or additionally, the clasp may incorporate a permanent magnet that is caused to subject or to cease subjecting a circuit of the wearable device to a magnetic field. More precisely, the clasp may be designed such that operating the clasp to an unclasped state to enable removal of the wearable device from a portion of the body of a person to which the wearable device is assigned causes the application of a magnetic field from a permanent magnet to a circuit or causes removal of such a magnetic field from that circuit. This, in turn, may cause erasure and/or corruption of the access credential to nullify it. Such use of a permanent magnet may make the inclusion of a power source within the wearable device unnecessary.

The wearable device may be one of multiple wearable devices that may have been prepared to work with a particular initialization device. Such preparation may include providing each of the multiple wearable devices with a unique identifier (e.g., a unique serial number), and may include providing the initialization device with copies of all of those identifiers. The provision of unique identifiers to each one of multiple wearable devices may enable the initialization device to recognize valid ones of the wearable devices and/or to distinguish between individual ones of the wearable devices assigned to different persons. Such preparation may also include providing the initialization device with an encryption key, and providing each of the wearable devices with an encryption key that matches the encryption key provided to the initialization device. These encryption keys may be employed by the initialization device and by each of the wearable devices to encrypt wireless communications between the initialization device and each of the wearable devices to at least prevent the unique identifiers assigned to each of the wearable devices from being intercepted by still another device.

The initialization device may be positioned at or near a location at which one or more secured items are typically accessed for use and/or where one or more secured items may be stored between uses. A person assigned one of the wearable devices may log into the initialization device using a password, biometrics and/or any of a variety of other approaches by which the initialization device may verify that the person is someone to whom access is to be granted to one or more secured items. The initialization device may also engage in wireless communications with the wearable device assigned to that person to also verify that the wearable device is one that is accepted for use in enabling access to the one or more secured items. In such wireless communications, the initialization device and the wearable device may employ their encryption keys to encrypt and decrypt at least the transmission of the unique identifier of the wearable device to the initialization device as part of the verification of the wearable device by the initialization device. Indeed, such encryption may also serve as a factor in the verification of the wearable device, since the initialization device would not be able to correctly decrypt the unique identifier of the wearable device if the encryption keys of the initialization device and the wearable device were not a match.

As an additional form of verification, the initialization device may also check whether the particular wearable device brought to the initialization device by the person who has logged into the initialization device is a wearable device that is assigned to that particular person. Alternatively or additionally, as still another form of verification, the initialization device may wirelessly communicate with the particular wearable device to obtain an indication as to whether or not the clasp has been operated to a clasped state such that the wearable device is being worn on a portion of the body of the person in a manner that would require operating the clasp to an unclasped state to remove the wearable device therefrom. Such wireless communications may also be encrypted using the encryption keys provided to the wearable device and the initialization device to again prevent interception by still another device. Indeed, in some embodiments, the provision of the unique identifier to the initialization device by the wearable device may in encrypted form, itself, be the indication that the clasp has been so operated to a clasped state.

Upon verifying the wearable device and/or the particular person who brought the wearable device to the initialization device, the initialization device may generate and/or wirelessly transmit the access credential to the wearable device to be stored by the wearable device for use with one or more access devices to enable access to one or more secured items. Again, encryption may be used in such wireless communications between the initialization device and the wearable device to prevent interception of the access credential. The initialization device and the wearable device may have been prepared to work with one or more particular access devices. Such preparation may include providing the initialization device with a mechanism to generate multiple access credentials to be provided to one or more wearable devices, and providing each of the access devices with an access credential that matches the access credentials that may be so generated and provided to wearable devices by the initialization device.

With the wearable device now provided with an access credential by the initialization device, the wearable device may now be ready to engage in wireless communications with one or more access devices to use its access credential to cause one of the access devices to grant access to an item that is secured by that access device. Again, as long as the clasp is maintained in a clasped status, the wearable device may continue to retain the access credential, and may therefore still be used in cooperation with an access device to enable the person wearing the wearable device to be granted access to an item to which that access device controls access. More specifically, upon the wearable device being brought into relatively close proximity to the access device, and if the access credential has not been nullified in response to the clasp being operated to an unclasped status, then the wearable device and the access device may engage in wireless communications in which the wearable device may transmit the access credential to the access device. The access device may use a matching access credential to verify the access credential it receives from the wearable device. Presuming that the access credential received from the wearable device is successfully verified, then the access device may taken an action to grant access to the secured item. Such an action may be to unlock a lock of cabinet, a door to a room or building, etc. Such action may be to signal a computing device, vehicle, etc. to allow itself to be operated.

In some embodiments, the wireless communications between the initialization device and wearable device, and between the wearable device and the access device may employ protocols and/or frequencies that adhere to one or more specifications for both wireless near-field communications (NFC) with and wireless provision of electric power to radio frequency identification (RFID) tags. Indeed, the wearable device may incorporate circuitry that includes RFID functionality to at least store the access credential.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of an access control system 1000 incorporating one or more of a provisioning server 100, an initialization device 300, one or more wearable devices 500 and one or more access devices 700. As depicted, each of the wearable devices 500 may be worn on a portion of the body of a person 600, and each of the access devices 700 may be associated with a secured item 800. The initialization device 300, the one or more wearable devices 500 and the one or more access devices 700 may be used in cooperation to control access to the one or more secured items 800 by each of the one or more persons 600. The provisioning server 100 may generate or enable the generation of various security credentials used by the other devices 300, 500 and 700 to perform such access control.

More specifically, the initialization device 300 may be positioned at a location at which one or more of the secured items 800 may be used and/or stored to be retrieved for use. In various embodiments, one or more of the secured items 800 may include a computing or other device, a vehicle or device mounted on a mobile platform, or a weapon or control console of a weapon that one or more of the persons 600 may seek access to use. Alternatively or additionally, the one or more secured items 800 may include a room of a building or other place into which one or more of the persons 600 may seek access to enter.

For a person 600 to be granted access to a secured item 800, that person 600 may bring a wearable device 500 to the initialization device 300 and may be required to wear that wearable device 500 as part of enabling that wearable device 500 to be initialized to cooperate with one or more access devices 700 to grant such access. The initialization device 300 may verify that the person 600 is someone to whom such access is to be provided and/or may verify that the wearable device 500 is a valid device to be initialized to provide such access. The initialization device 300 may also verify that the wearable device 500 is currently being worn by the person 600. In response to successful verification of one or more of these, the initialization device 300 may so initialize the wearable device 500 to enable the wearable device 500 to be capable of providing the person 600 with access to a secured item 800 as long as the person 600 continues to wear the wearable device 500.

While still wearing the wearable device 500, the person 600 may bring the wearable device 500 into relatively close proximity to an access device 700. The access device 700 may engage in wireless communications with the wearable device 500 to verify the wearable device 500 is a valid device that validly indicates that the person 600 is to be granted access to the secured item 800 by the access device 700. As part of such verification, the wearable device 500 may provide the access device 700 with an indication as to whether the wearable device 500 has at any time ceased to be worn by the person 600 such that the wearable device 500 can no longer validly indicate that the person 600 is to be granted access to the secured item 800. In response to successful verification, the access device 700 may grant access to the secured item 800 to the person 600.

Each of these devices 100, 300, 500 and 700 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

It should be noted that in alternate embodiments, two or more of these devices 100, 300, 500 and 700 may be combined into a single device. By way of example, the provisioning device 100 and the initialization device 300 may be combined into a single device that both provisions other devices with security credentials and prepares wearable devices 500 for use with access devices 700. By way of another example, the initialization device 300 may be combined with one of the access devices 700. Other embodiments may include still others of such combinations.

As depicted, two or more of these computing devices 100, 300, 500 and 700 may exchange signals conveying data in support of controlling access to one or more secured items 800. Among at least the computing devices 100, 300 and 700, such exchanges may occur through a network 999 to exchange identification information and/or security credentials. Further, among at least the computing devices 300, 500 and 700, such exchanges may occur through point-to-point wireless near-field communications, as will be described in greater detail. However, one or more of these computing devices may exchange other data entirely unrelated to controlling access to one or more secured items 800 with each other and/or with still other computing devices (not shown) via the network 999 or one or more of such point-to-point wireless communications.

In various embodiments, at least the network 999 may be a single network possibly limited to extending within a single building or other relatively limited area, a combination of connected networks possibly extending a considerable distance, and/or may include the Internet. Thus, at least the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the initialization device 300 may incorporate one or more of a processor component 350, a storage 360, a sensor 315, controls 320, a display 380 and an interface 390 accompanied by an antenna 391 to couple the initialization device 300 to the network 999 and/or to one or more of the wearable devices 500 via wireless communications. The storage 360 may store one or more of a control routine 340, identification (ID) data 135, account data 333, an encryption key 335 and access credentials 537. The control routine 340 may incorporate a sequence of instructions operative on the processor component 350 to implement logic to perform various functions.

The controls 320 may be any of a variety of type of manually operable controls, including and not limited to, buttons, switches, a keypad or keyboard, a mouse or touchpad, a microphone to accept voice commands, etc. The controls 320 and the display 380 may be operated in combination to provide a user interface for the initialization device 300. The sensor 315 may be any of a variety of biometric sensor operable to take a measure of a biological characteristic of a person 600 that enables that person 600 to be identified, including and not limited to, a fingerprint reader to scan a fingerprint, a microphone to record a voice for voiceprint analysis, a camera to capture an image of a face for facial recognition, etc.

The interface 390 and the antenna 391 may cooperate to engage in wireless point-to-point NFC with one or more of the wearable devices 500. In so doing, the interface 390 and the antenna 391 may also cooperate to generate an electromagnetic field to wirelessly convey electric power to one or more of the wearable devices 500 that are within a relatively short distance from the antenna 391. As familiar to those skilled in the art, such a short distance may be a few centimeters to a foot or two feet from the antenna 391, depending on various factors including and not limited to the strength of the electromagnetic field generated, the shape of the antenna 391, the size of the antenna 391, the frequency of the electromagnetic field, etc. The NFC and wireless provision of power engaged in by the interface 390 and the antenna 391 may employ frequencies, protocols and/or other characteristics that adhere to one or more specifications for widely known and used radio-frequency identification (RFID) tags. Indeed, in some embodiments, the interface 390 and/or the antenna 391 may be components of a RFID reader of the initialization device 300.

In various embodiments, each of the wearable devices 500 may incorporate one or more of a processor component 550, a storage 560, a power source 510, a clasp 501, a sensor 515, and an interface 590 accompanied by an antenna 591 to couple the wearable device 500 to one or the other of the initialization device 300 or one of the access devices 700 via wireless communications. The storage 560 may store one or more of a control routine 540, ID data 135, an encryption key 533 and an access credential 537. In embodiments in which the processor component 550 is capable of executing a sequence of instructions, the control routine 540 may incorporate a sequence of instructions operative on the processor component 550 to implement logic to perform various functions.

Figure 2:
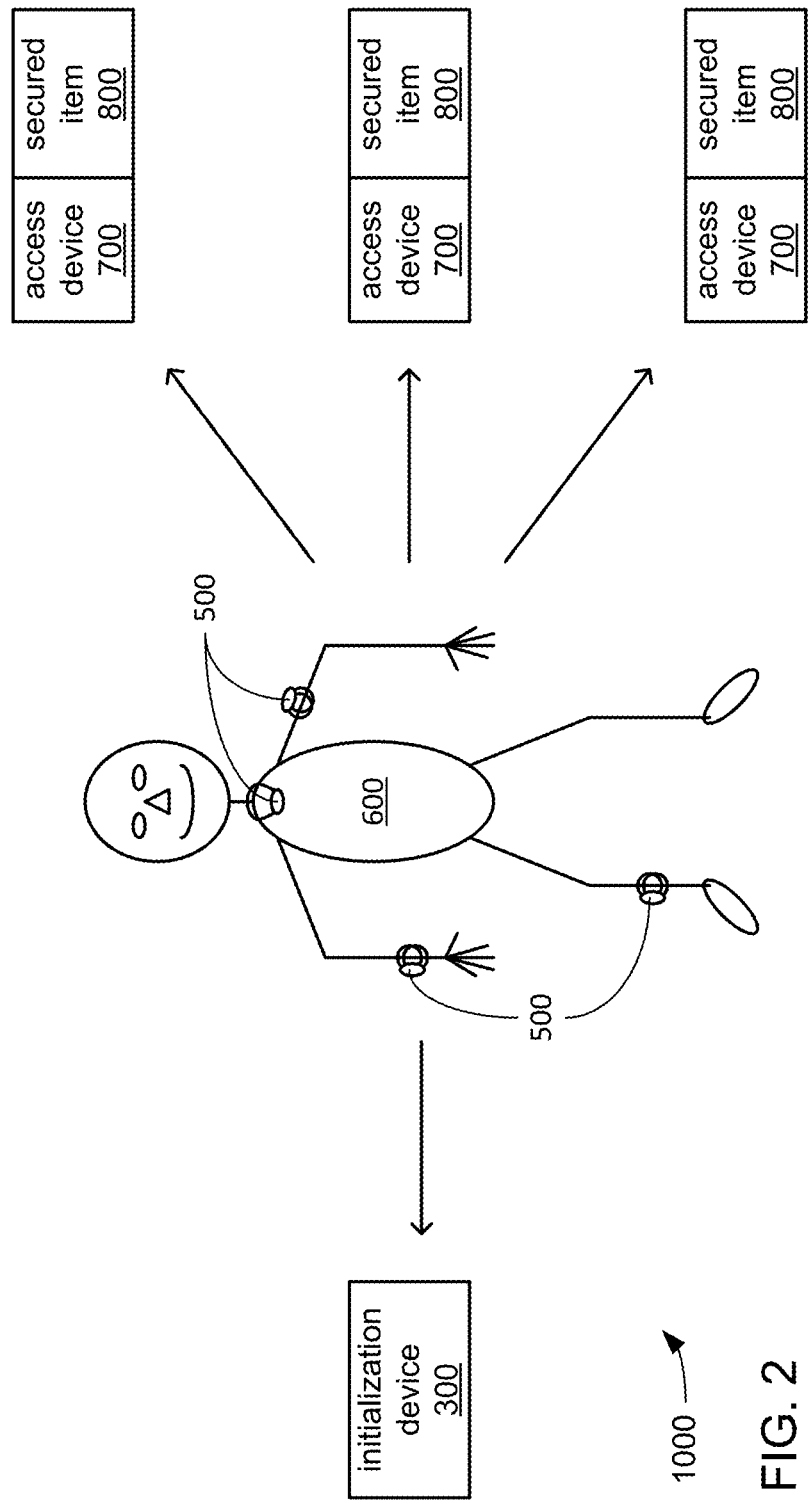
FIG. 2 illustrates an example embodiment of use of an access control system.
Figure 3:
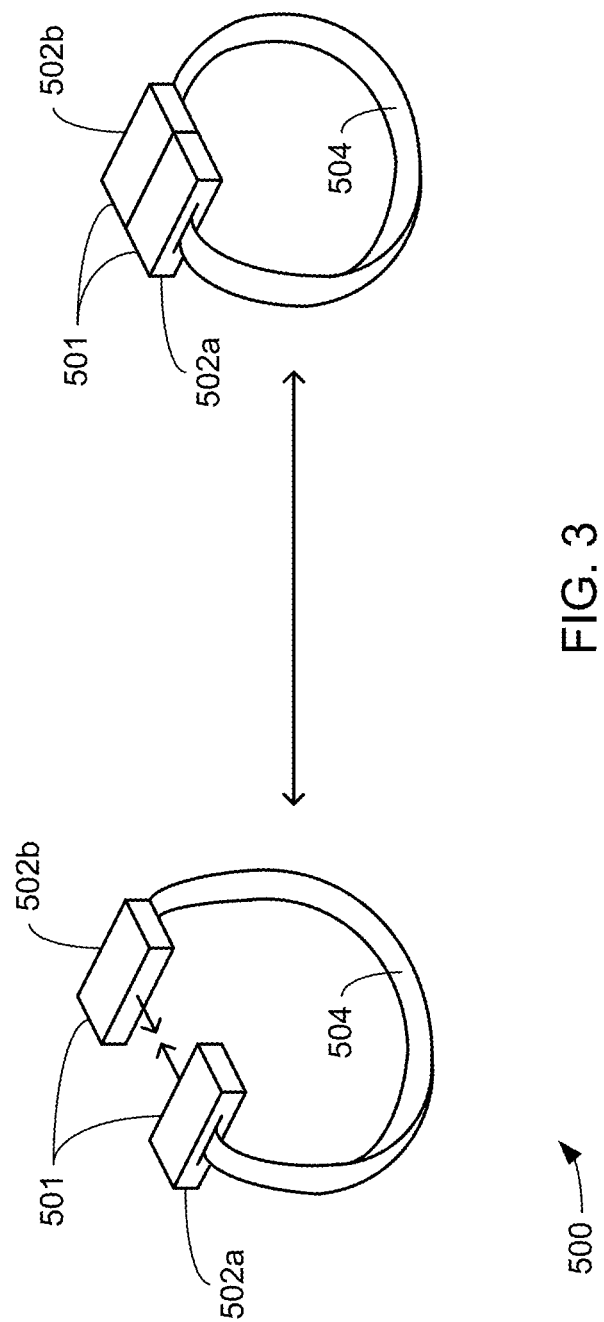
FIG. 3 illustrates a perspective view of operation of a clasp of a wearable device between clasped and unclasped states.

The wearable device 500 may be of any physical configuration designed to be worn on any portion of the body of a person 600 where it cannot be removed without operating the clasp 501 to change its state from a clasped state to an unclasped state. By way of examples presented in FIG. 2, the wearable device 500 may be a wristband, wrist bracelet, armband, neckband, pendant, leg band, ankle bracelet, etc. The clasp 501 may take any of a variety of forms that are operable to a clasped state that causes a wearable portion 504 to wrap around a portion of the body of a person 600 in a manner that fits closely enough to prevent removal (e.g., prevents being "slipped off"), and an unclasped state in which two portions of the wearable device 500 are separated or in which at least one physical dimension of the wearable portion 504 is changed to enable removal. FIG. 3 depicts an example of such operation of the clasp 501 between clasped and unclasped states. The clasp 501 may be any of a variety of types of fastener operable between a clasped state preventing removal of the wearable device 500 from a portion of the body of a person 600, and such an unclasped state that enables such removal, including and not limited to fasteners commonly used in the garment industry such as a button, a zipper, a metal snap, a buckle, etc. Returning to FIG. 1, as will be explained in greater detail, a portion of the clasp 501 may include a mechanism to erase, alter or otherwise nullify the access credential 537 in response to the clasp 501 being operated from the clasped state to the unclasped state. As will also be explained, different embodiments of that mechanism may or may not require the provision of electric power.

In embodiments of the wearable device 500 that include the power source 510, the power source 510 may include any of a variety of types of power source of sufficiently small physical dimensions and weight that is able to be carried on a portion of the body of a person 600. By way of example, the power source 510 may include a component to store electric power such as a battery (e.g., a "coin-type" lithium battery or rechargeable lithium ion battery). Embodiments of the wearable device 500 that include the power source 510 where the power source 510 is a non-rechargeable and non-replaceable battery may be intended for use for a relatively limited period of time, and may therefore be disposable. Alternatively, the power source 510 may include a relatively small solar cell or solar panel able to generate electric power from surrounding light. Also alternatively, the power source 510 may include any of a variety of types of generator that generates electric power from thermal energy output by the body of a person 600 and/or from physical movement of at least the body portion of the person 600 on which the wearable device 500 is worn. Still further, in some embodiments, the power source 510 may incorporate such a solar cell and/or such a generator along with a rechargeable battery (e.g., a lithium ion battery, a nickel metal hydride battery, etc.). In such embodiments, the battery may be recharged whenever light levels, body heat output and/or body portion movement provide an opportunity to do so.

In embodiments of the wearable device 500 that include the sensor 315, the sensor 315 may be any of a variety of biometric sensor operable to detect whether or not the wearable device 500 is currently being worn by a person 600 on some portion of their body, including and not limited to, an infrared or other sensor to detect body heat, a transducer to detect bioelectric activity on a skin surface, etc. Use of the sensor 315 may be deemed desirable to address the possibility of the clasp 501 of the wearable device 500 being operated to a clasped state without the wearable device 500 actually being worn a body portion of any person 600.

The interface 590 and the antenna 591 may cooperate to engage in wireless point-to-point NFC with the initialization device 300 and one or more of the access devices 700. In so doing, the interface 590 and the antenna 591 may also cooperate to receive an electromagnetic field from the initialization device 300 or one of the access devices 700 that wirelessly conveys electric power to the wearable device 500, while the wearable device 500 is within a relatively short distance to either of the devices 500 or 700. As with the initialization device 300, the NFC and wireless provision of power engaged in by the interface 590 and the antenna 591 of the wearable device 500 may conform to one or more specifications for RFID tags. Indeed, in some embodiments, a portion of the wearable device 500 may be implemented or otherwise incorporate a RFID tag.

As recognizable to those skilled in the art, the amount of electric power that may be conveyed wirelessly may be relatively limited such that the extent of functionality provided by the wearable device 500 may be relatively limited. This may be especially true in embodiments of the wearable device 500 that do not include the power source 510 such that the only electric power available for such embodiments is that which is received wirelessly by an electromagnetic field. Thus, in such embodiments, the processor component 550 may be relatively simple form of processor component, microcontroller, sequencer, state machine implemented with digital logic, etc. that may or may not be capable of executing a sequence of instructions of a routine (e.g., the control routine 540).

In various embodiments, each of the access devices 700 may incorporate one or more of a processor component 750, a storage 760 and an interface 790 accompanied by an antenna 791 to couple the access device 700 to the network 999 and/or to one or more of the wearable devices 500 via wireless communications. The storage 760 may store one or more of a control routine 740, the encryption key 335 and access credentials 735. The control routine 740 may incorporate a sequence of instructions operative on the processor component 750 to implement logic to perform various functions.

In a manner quite similar to the interface 390 and the antenna 391 of the initialization device 300, the interface 790 and the antenna 791 of the access device 700 may also cooperate to engage in wireless point-to-point NFC with one or more of the wearable devices 500. Further, the interface 790 and the antenna 791 may also similarly cooperate to generate an electromagnetic field to wirelessly convey electric power to one or more of the wearable devices 500 that are within a relatively short distance from the antenna 791.

Prior to operation of the access control system 1000, the initialization device 300, each of the one or more wearable devices 500 and each of the one or more access devices 700 may be provisioned with various security credentials from the provisioning server 100. The initialization device 300 and/or some or all of the access devices 700 may be provided such security credentials by the provisioning server 100 via the network 999. Alternatively or additionally, any of a variety of types of removable media may be employed to convey security credentials from the provisioning server 100 to the initialization device 300 and/or some or all of the access devices 700, including and not limited to optical disc storage media or solid-state storage devices (e.g., so-called "thumb drives"). Regarding the wearable devices 500, each of the wearable devices 500 may be provisioned with security credentials at the time each is manufactured or otherwise prepared for use within the access control system 1000.

More specifically, each of the one or more wearable devices 500 may be provisioned with a unique one of the ID data 135, thereby providing each of the wearable devices 500 with a unique identifier that enables it to be distinguished from the others. Each of the wearable devices 500 may also be provisioned with an encryption key 533 to enable use of encryption in wireless communications with the initialization device 300 and each of the one or more access devices 700.

Also, the initialization device 300 may be provisioned with the encryption key 335 to be matched to the one or more encryption key(s) 533 provided to the one or more wearable devices 500 to also enable use of encryption in wireless communications therewith. The initialization device 300 may also be provisioned with the ID data 135 for each of the one or more wearable devices 500 to use in validating the unique identifiers of each of the one or more of the wearable devices 500. The initialization device 300 may further be provisioned with one or more access credentials 537 to be provided to validated ones of the one or more wearable devices 500 for use in cooperating with one or more of the access devices 700 to grant access to one or more secured items 800.

Further, each of the one or more access devices 700 may be provisioned with the encryption key 335 to again be matched the encryption keys 533 provided to the one or more wearable devices 500 to also enable use of encryption in wireless communications therewith. Each of the access devices 700 may also be provisioned with one or more of the access credentials 735 to be matched to the access credential 537 provided to a validated one of the wearable devices 500 as part of cooperating with one or more of the wearable devices 500 to grant access to one or more secured items 800.

It should be noted that in alternate embodiments, the initialization device 300 and/or one or more of the access devices 700 may be provide with security credentials from the provisioning device 100 that enable the initialization device 300 and/or one or more of the access devices 700 to generate security credentials used in interactions with one or more of the wearable devices 500, instead of being provided with those credentials for interacting with one or more of the wearable devices 500 directly from the provisioning device 100. For example, the access credential(s) 537 provided by the initialization device 300 to one or more of the wearable devices 500 may be generated within the initialization device 300 from other security credentials earlier provided to the initialization device 300.

In executing the control routine 340, the processor component 350 of the initialization device 300 may be caused to await an indication of a person 600 seeking to initialize a wearable device 500 for use in gaining access to one or more secured items 800. Such an indication may operation of the controls 320 by the person 600 to log into account associated with that person 600 using such information as a password and/or account identifier to enable verification of that person 600 as authorized to be granted access to the one or more secured items 800. Alternatively or additionally, such an indication may be use by that person of the sensor 315 to enable biometrically based identification of that person 600 to verify that person 600 as so authorized. In attempting to verify the person 600 as being so authorized, the processor component 350 may compare the password, account identifier or other security credential provided via the controls 320 to a listing of such credentials stored as part of the account data 333 for multiple persons 600. Alternatively or additionally, in attempting to verify the person 600, the processor component 350 may compare the biometric data collected by sensor 315 to a listing of such biometric data stored as part of the account data 333 for multiple persons 600.

Presuming that the person 600 is successfully verified, the processor component 350 may operate the interface 390 to generate an electromagnetic field to wirelessly convey electric power to the wearable device 500 that the now verified person 600 brought with them. Presuming that the person 600 did bring a wearable device 500 with them and the person 600 holds it within the relatively short distance from the antenna 391, the wirelessly conveyed electric power may enable the wearable device 500 to participate in NFC with the initialization device 300.

In executing the control routine 540, the processor component 550 of the wearable device 500 may respond to the wireless provision of electric power by the initialization device 300 by retrieving from the ID data 135 stored within the storage 560 an identifier that may be uniquely associated with this particular wearable device 500, and the processor component 550 may then operate the interface 590 to transmit that identifier to the initialization device 300. In so doing, processor component 550 may retrieve the encryption key 533 also stored within the storage 560, and may use the encryption key 533 to encrypt the identifier before transmitting the identifier to the initialization device 300 to prevent interception and/or use of the identifier by still another device. The processor component 550 may further check the status of the clasp 501 to determine whether the clasp 501 is in a clasped or unclasped state, and the processor component 550 may include an indication of that status in the transmission of the identifier to the initialization device 300.

In embodiments of the wearable device 500 that include the sensor 515, the processor component 550 may operate the sensor 515 to determine whether or not the wearable device 500 is being worn on a portion of a body of a person 600, and the processor component 550 may include an indication of whether or not the wearable device 500 is being worn in the transmission of the identifier to the initialization device 300. It should be noted that, in some embodiments, the sensor 515 may not be capable of identifying who that person 600 is such that it may not be possible to use the sensor 515 to determine whether the wearable device 500 is being worn on a portion of the body of the same person 600 who has been verified. Such a limitation of the sensor 515 may arise from the particular body portion the wearable device 500 is intended to worn around and/or limitations of what type of sensor technology is able to be used given the limited amount of electric power that can be wirelessly conveyed.

Upon receiving the transmission of at least the identifier of the wearable device 500, the processor component 350 may be caused to retrieve the encryption key 335 from the storage 360, and may use it to decrypt the received identifier. In some embodiments, the encryption key 335 provided to the initialization device 300 and to the one or more access devices may be matched to multiple ones of the encryption keys 533 that may be each be provided to a different one of the wearable devices 500. In other embodiments, there may be only one of each of the encryption keys 335 and 533. In some embodiments, the encryption key 335 provided to the initialization device 300 and the one or more encryption keys 533 provided to the one or more wearable devices 500 may represent an implementation of matching public and private encryption keys, or of any other form of matching sets of encryption keys. More broadly, in various embodiments, each of the encryption keys 335 and 533 may be any of a variety of types of security credential (e.g., cryptographic key, hash, certificate, etc.) or a combination of security credentials that are able to be employed by the processor component 350 and the processor component 550 to effect encrypted one-way or two-way communications between at least the initialization device 300 and one or more of the wearable devices 500.

After decrypting the identifier, the processor component 350 may then use the identifier to attempt to verify the wearable device 500 as a being a device authorized for use in granting access to one or more secured items 800 as part of the access control system 1000. In attempting to verify the wearable device 500 as being so authorized, the processor component 350 may compare the identifier to a listing of such credentials stored as part of the account data 333 for multiple wearable devices 500. In some embodiments and where wearable devices 500 authorized for use as part of the access control system 1000 are assigned to particular persons 600 authorized to be granted access to secured item(s), the account data 333 may correlate identifiers of authorized wearable devices 500 to identities of authorized persons.

Presuming that the wearable device 500 is successfully verified as being authorized for use as part of the access control system 1000 and/or verified as assigned to the verified person, the processor component 350 may be further caused to attempt to verify that the verified person 600 is currently wearing the now verified wearable device 500. In some embodiments, the processor component 350 may operate the display 380 and/or controls 320 in a manner providing a user interface that the processor component 350 may employ to request the person 600 to verify that they are currently wearing the wearable device 500. Alternatively or additionally, where the wearable device 500 transmits an indication of whether or not the clasp 501 is in a clasped or unclasped state, the processor component 350 may accept an indication of the clasp 501 as in the clasped state as verification that the person 600 is wearing the wearable device 500. If, however, the indication from the wearable device 500 is of the clasp 501 being in the unclasped state, then the processor component 350 may operate the display 380 to present the person 600 with an instruction to start wearing the wearable device 500. The processor component 350 may then await a predetermined period of time for the person 600 to do so before again attempting to verify that the person 600 is wearing the wearable device 500. If the person 600 fails to do so, the processor component 350 may repeat the verification of the person 600 and/or the wearable device 500 before again attempting to verify that the person 600 is wearing the wearable device 500.

In embodiments in which the wearable device 500 includes the sensor 515 such that the wearable device 500 transmits an indication to the initialization device 300 of whether the wearable device 500 is currently being worn on a portion of a body of a person 600, the processor component 350 may accept an indication of the wearable device 500 as currently being worn as verification that the person 600 is wearing the wearable device 500. If, however, the indication from the wearable device 500 is of the wearable device 500 as not currently being worn, then once again, the processor component 350 may operate the display 380 to present the person 600 with an instruction to start wearing the wearable device 500. The processor component 350 may then await a predetermined period of time for the person 600 to do so before again attempting to verify that the person 600 is wearing the wearable device 500. Again, if the person 600 fails to do so, the processor component 350 may repeat the verification of the person 600 and/or the wearable device 500 before again attempting to verify that the person 600 is wearing the wearable device 500.

It should be noted that in some embodiments, the indication(s) that may be provided by the wearable device 500 to the initialization device 300 of whether the clasp 510 is currently in a clasped state and/or of whether the sensor 515 indicates that the wearable device 500 is currently being worn may not be conveyed in distinct transmissions and/or in transmissions that accompany the identifier transmitted by the wearable device 500 to the initialization device 300. Instead one or both of those indications may be implied by whether or not the wearable device 500 transmits its identifier to the initialization device, at all. In other words, if the processor component 550 detects that the clasp 501 is currently in an unclasped state and/or that the sensor 515 (if presented) indicates that the wearable device 500 is currently not being worn, then the processor component 550 may refrain from transmitting the identifier retrieved from the ID data 135 for the wearable device, at all. Thus, the fact of the processor component 550 proceeding with transmitting that identifier to the initialization device 300 may itself be an indication that the clasp 501 is in a clasped state and/or that the wearable device 500 is currently being worn.

In response to verifying the person 600 as authorized to be granted access to the one or more secured items 800, to verifying the wearable device 500 as authorized for use with the access control system 1000 to grant such access, to verifying that the wearable device 500 is assigned to the person 600, and to verifying that the wearable device 500 is currently being worn (to the extent possible), the processor component 350 may retrieve one of the access credentials 537 from the storage 360, and may operate the interface 390 to transmit that access credential 537 to that verified wearable device 500. In so doing, processor component 550 may use the encryption key 335 to encrypt the access credential 537 before transmitting the access credential 537 to the wearable device 500 to prevent interception and/or use of the identifier by still another device.

In some embodiments, the access credential 537 may be accompanied by or may otherwise incorporate an indication of a limitation on access granted to the person 600. By way of example, there may be a limitation concerning which of multiple secured items 800 that the person 600 is to be granted access to. By way of another example, the access granted to the person may be time limited to a few hours, a day, a few days, a week, etc. Alternatively or additionally, access may be granted according to a daily or weekly schedule (e.g., only within particular hours of the day and/or during particular days of a week). Bits, bytes or other data structures that indicate such limitations may be embedded in or otherwise accompany the access credential 537. Alternatively or additionally, different ones of the access credentials 537 that are available for the processor component 350 to transmit to the wearable device 500 may be associated with different limitations on time and/or during which access may be granted to the person 600 for particular secured items 800.

Upon transmitting the access credential 537 to the wearable device 500, the processor component 350 may operate the display 380 to give visual confirmation to the person 600 that the wearable device 500 has been initialized such that it can be used with one or more of the access devices 700 to gain access with one or more of the secured items 800. Further, the processor component 350 may operate the interface 390 to cease engaging in NFC with the wearable device 500 and/or to cease conveying electric power to the wearable device 500 by generating an electromagnetic field.

Upon receiving the access credential 537 from the initialization device, the processor component 550 may use the encryption key 533 to decrypt the access credential 537, and then the processor component 550 may store the access credential 537 within the storage 560. With the cessation of wireless conveyance of electric power to the wearable device 500 by the initialization device 300, the wearable device 500 may enter into lower power mode where either no electric power continues to be used within embodiments of the wearable device 500 that do not include the power source 510 or electric power is used at a minimal rate of consumption within embodiments of the wearable device 500 that do include the power source 510. Various approaches may be employed during such a lower power mode of minimal or no electrical power consumption to continuously monitor the status of the clasp 501 and/or to act to nullify the access credential 537 in response to an occurrence of the clasp 501 being operated from a clasped state to an unclasped state.

In some embodiments, the access credential may be retained in a manner that uses electric power at a relatively low rate of power consumption such that the wearable device incorporates a power source such as a battery, solar cell and/or generator using body heat and/or body motion to generate electricity. In such embodiments, the access credential may be nullified by being erased, altered in a manner that corrupts it, or otherwise marked with or accompanied by an indication of the clasp having been operated to an unclasped state in response to the clasp being so operated such that a switch detects such operation of the clasp. In some of such embodiments, such a switch may break cut off the provision of electric power to a circuit to cause erasure or corruption of the access credential, and/or marking with an indicator of the clasp having been so operated. In other embodiments, the access credential may be retained in a manner that uses no electric power. In such embodiments, the access credential may be nullified by being erased or at least altered in a manner that corrupts it by exposing a portion of circuitry that stores the access credential to a magnetic field from a permanent magnet in response to the clasp being operated to an unclasped state. In such embodiments, the permanent magnet may be mechanically moved away from the circuit by a mechanical feature of the clasp when the clasp is in a clasped state, and may be allowed to be urged toward the circuit by a spring or other mechanical feature of the clasp when the clasp is an unclasped state.

i. In executing the control routine 740, the processor component 750 of the access device 700 may respond to an indication of the person 600 seeking to use their wearable device 500 in cooperation with the access device 700 to be granted access to a secured item 800 associated with that access device 700 by operating the interface 790 to generate an electromagnetic field to wirelessly convey electric power to the wearable device 500 that the person 600 bought with them. Although not specifically depicted, the access device 700 may include or be otherwise coupled to a manually operable control or other mechanism by which the person 600 may provide the indication to the access device 700 that they are seeking to be granted access to the secured item 800. By way of example, where the secured item 800 includes its own manually operable controls, a proximity sensor to detect the approach of the person 600 or other mechanism by the person 600 is able to indicate an intention to use the secured item 800, the secured item 800 may provide the indication to the access device 700 of this intention on the part of the person 600.

In again executing the control routine 540, the processor component 550 of the wearable device 500 may respond to the wireless provision of electric power by the access device 700 by retrieving the access credential 537 from the storage 560. Presuming that clasp 501 has not been operated from a clasped state to an unclasped state since initialization of the wearable device 500 in which the wearable device 500 was provided with the access credential 537, then no action should have been taken by any component of the wearable device 500 to nullify the access credential 537. Thus, the access credential 537 should still be stored within the storage 560 intact such that it can be retrieved by the processor component 550. However, if the clasp 501 has been operated to change its status from clasped to unclasped since the provision of the access credential 537 to the wearable device 500, then the access credential 537 may have been erased from the storage 560, altered or otherwise corrupted within the storage 560 such that it is no longer intact, or may now be otherwise nullified by the storage of an indication of the occurrence of the change in state of the clasp 501 to an unclasped state. Various mechanisms by which the access credential 537 may be nullified will be discussed later in greater detail.

Presuming that the access credential 537 is successfully retrieved intact from the storage 560 and is not otherwise nullified, then the processor component 550 may further respond to the wireless provision of electric power by the access device 700 by operating the interface 590 to transmit the access credential 537 to the access device 700. In so doing, processor component 550 may retrieve the encryption key 533 also stored within the storage 560, and may use the encryption key 533 to encrypt the access credential 537 before transmitting the access credential 537 to the access device 700 to prevent interception and/or use of the access credential 700 by still another device.

However, if the clasp 501 has been operated to an unclasped state following receipt and storage of the access credential 537 within the storage 560, then the access credential 537 may have been nullified. Again, nullification may entail complete erasure of the access credential 537 by resetting the storage locations of the storage 560 in which it is stored to a known reset state (e.g., all binary 1 or binary 0 values), by altering the access credential 537 such that it is corrupted (e.g., at least a portion of the access credential 537 is replaced by other bit values). Alternatively or additionally, nullification may entail marking in which an indication is stored within the storage 560 (or elsewhere within the wearable device 500) that the clasp 501 has been operated to an unclasped state since the receipt and storage of the access credential 537. Such an indication may take the form of setting or resetting one or more bits within the storage 560 or elsewhere with value(s) that are interpreted as indicating such an operation of the clasp 501 to an unclasped state.

In some embodiments, the access credential 537 may be stored within a portion of the storage 560 that is susceptible to being altered by a magnetic field from a permanent magnet incorporated into the wearable device 500. With the clasp 501 in the clasped state, the permanent magnet may be moved to a position further away from the susceptible portion of the storage 560 such that the access credential 537 is able to be stored and maintained therein intact. However, if the clasp 501 is operated to an unclasped state, then the permanent magnet may be moved or allowed to move to a position closer to the susceptible portion of the storage 560 such that the access credential 537 is at least altered to the point of becoming corrupted such that it is no longer intact, if not entirely erased. As a result, what may be retrieved from the storage 560 for encryption and transmission to the access device 700 may be a random set of bit values that in no way make up a valid access credential, and the access device 700 may respond to receiving such a random set of bit values by refusing to grant access to a secured item 800.

However, in such embodiments that make such use of a permanent magnet, the processor component 550 may perform any of a variety of tests on the access credential 537 to verify that it is still intact before encrypting and transmitting it to the access device 700. Such a test may, by way of example, be a checksum test using a checksum value that the processor component 550 may have derived from the access credential 537 follow its receipt from the initialization device 300. If the test reveals that the access credential 537 is still intact, then the processor component 550 may proceed with encrypting and transmitting it to the access device 700. However, if the access credential 537 is found to not be intact (e.g., altered such that it is corrupted, or erased), then the processor component 550 may refrain from either encrypting or transmitting it to the access device 700. Instead, the processor component 550 may transmit to the access device 700 an indication of having no intact access credential available to send, which may lead to the access device 700 refusing to grant access to a secured item 800.

In other embodiments of the wearable device 500 that include the power source 510, the access credential 537 may be stored within a portion of the storage 560 that is susceptible to loss of electric power provided by the power source 510 such that the access credential 537 may be erased, and/or to alteration by the processor component 550 to the extent of the access credential at least being corrupted, if not erased by the processor component 550. With the clasp 501 in the clasped state, electrical contacts and/or a switch coupled to and/or incorporated into the clasp 501 may be operated to provide the susceptible portion of the storage 560 and/or the processor component 550 with electric power from the power source 510. While such provision of electric power from the power source 510 continues, the access credential 537 may continue to be maintained within the susceptible portion of the storage 560 intact. However, with the clasp 501 operated from the clasped state to an unclasped state, the electrical contacts and/or the switch may cease to be operated to provide electric power from the power source 510 to the susceptible portion of the storage 560 and/or to the processor component 550. It may be that the loss of electric power from the power source 510 to the susceptible portion of the storage 560, by itself, renders the susceptible portion incapable of continuing to maintain the access credential 537 therein such that the access credential 537 is erased through deprivation of electric power. Alternatively or additionally, it may be that the processor component 550 is able to use a residual amount electric power following the cessation of its provision from the power source 510 to access the susceptible portion of the storage 560 to alter at least a portion of the access credential 537, and/or to signal the storage 560 to itself alter at least a portion of the access credential 537 with such a residual amount of electric power. Again, at a later time when the wearable device 500 is brought to and wirelessly interacts with the access 700, the lack of an intact access credential stored within the susceptible portion of the storage 560 may lead to refusal by the access device 700 to grant access to the secured item 800.

Upon receiving the transmission of the access credential 537, the processor component 750 may be caused to retrieve the encryption key 335 from the storage 360, and may use it to decrypt the received access credential 537. In some embodiments, the encryption key 335 provided to the access device 700 may be the very same one also provided to the initialization device 300. Alternatively, the access device 700 may be provided with an encryption key that is different than the encryption key 335 provided to the initialization device 300, but still matching the one or more encryption keys 533 that may each be provided to different ones of the wearable devices 500. Again, the encryption key 335 provided to the initialization device 300 and/or the access device(s) 700, and the one or more encryption keys 533 provided to the one or more wearable devices 500 may represent an implementation of matching public and private encryption keys, or of any other form of matching sets of encryption keys. More broadly, each of the encryption keys 335 and 533 may be any of a variety of types of security credential or a combination of security credentials that are able to be employed by the processor component 750 and the processor component 550 to effect at least encrypted one-way communications between at least the wearable device 500 and the access device 700 for the transmission of the access credential 537 therebetween.

After decrypting the access credential 537, the processor component 750 may then retrieve the access credential 735 from the storage 760, and may then use the access credential 735 to verify the access credential 537 just received from the wearable device 500. As has been discussed, there may be more than one of the wearable devices 500, and each of the wearable devices 500 may be provided with the very same access credential 537 by the initialization device 300, or may each be provided with a different one. As has also been discussed, there may be more than one of the access devices 700, and each of the access devices 700 may be provided with the very same access credential 735 by the provisioning server 100, or may each be provided with a different one. Each of the one or more access credentials 537 and each of the one or more access credentials 735 may be of any of a variety of types of cryptographic credential (e.g., cryptographic key, hash, certificate, etc.) adhering to any of a variety of algorithms by which one may be used to verify the other. Thus, regardless of whether there is one or more than one of each of the access credentials 537 and 735 used throughout the example access control system 1000 of FIG. 1, the access credential 735 provided to the particular access device 700 to which this particular person 600 brings the wearable device 500 in this example may be a match to the access credential 537 that was provided to that wearable device 500 by the initialization device 500.

Presuming that the access credential 537 from received from the wearable device 500 was able to be verified by the processor component 750 such that the person 600 is verified through the wearable device 500 as a person to authorized to be granted access to the secured item 800, the processor component 750 may next check whether there are any restrictions imposed on that grant of access. As previously discussed, the access credential 537 may be accompanied by or otherwise incorporate an indication of a temporal or other restriction in granting access to one or more particular secured items 800. If no such restrictions currently apply, then the processor component 750 may take action to grant the person 600 access to the secured item 800. Depending on the nature of that secured item 800, such action by the processor component 750 may take any of a variety of forms, including and not limited to, enabling the provision of electric power to the secured item 800, enabling access to manually operable controls of the secured item 800, signaling the secured item 800 to allow the person 600 to use its user interface, permitting starting of the engine of the secured item 800 where the secured item 800 is a vehicle, unlocking a lock of a cabinet in which the secured item 800 is stored, or unlocking a door where the secured item 800 is a room or other structure into which the person 600 may enter.

Figure 4:
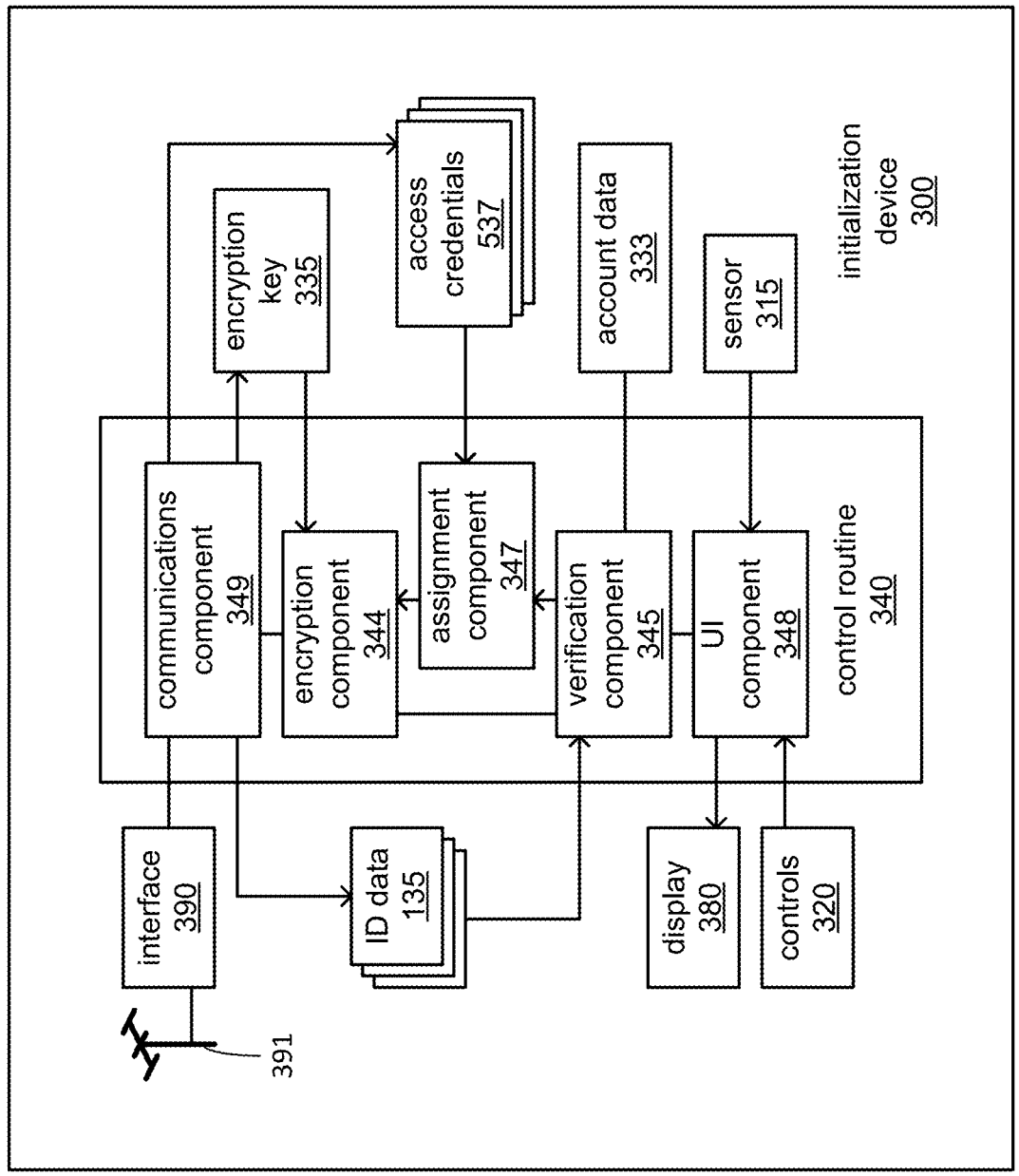
FIGS. 4 and 5 each illustrate a portion of an example embodiment of an access control system.
Figure 5:
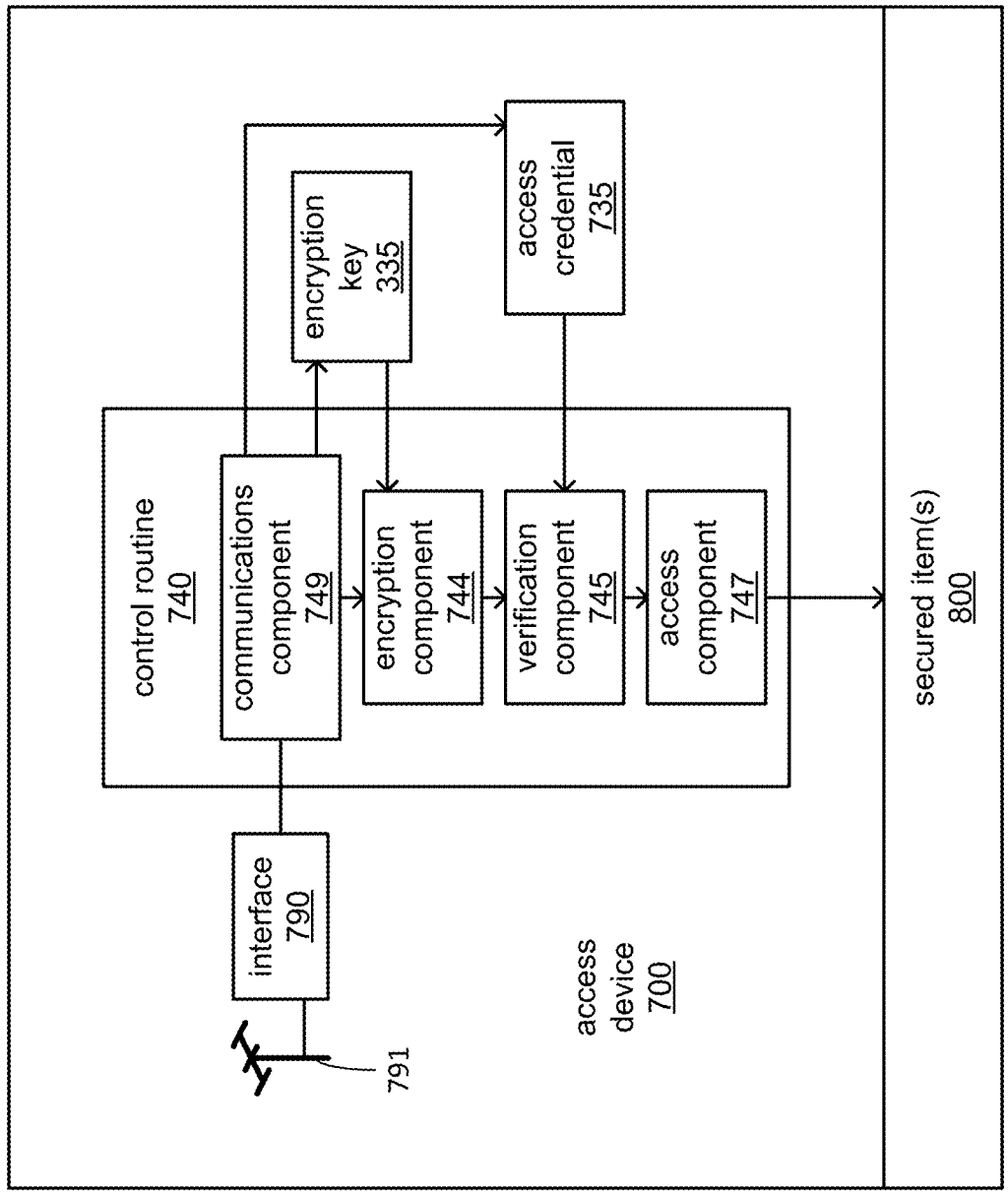
Figure 6A:
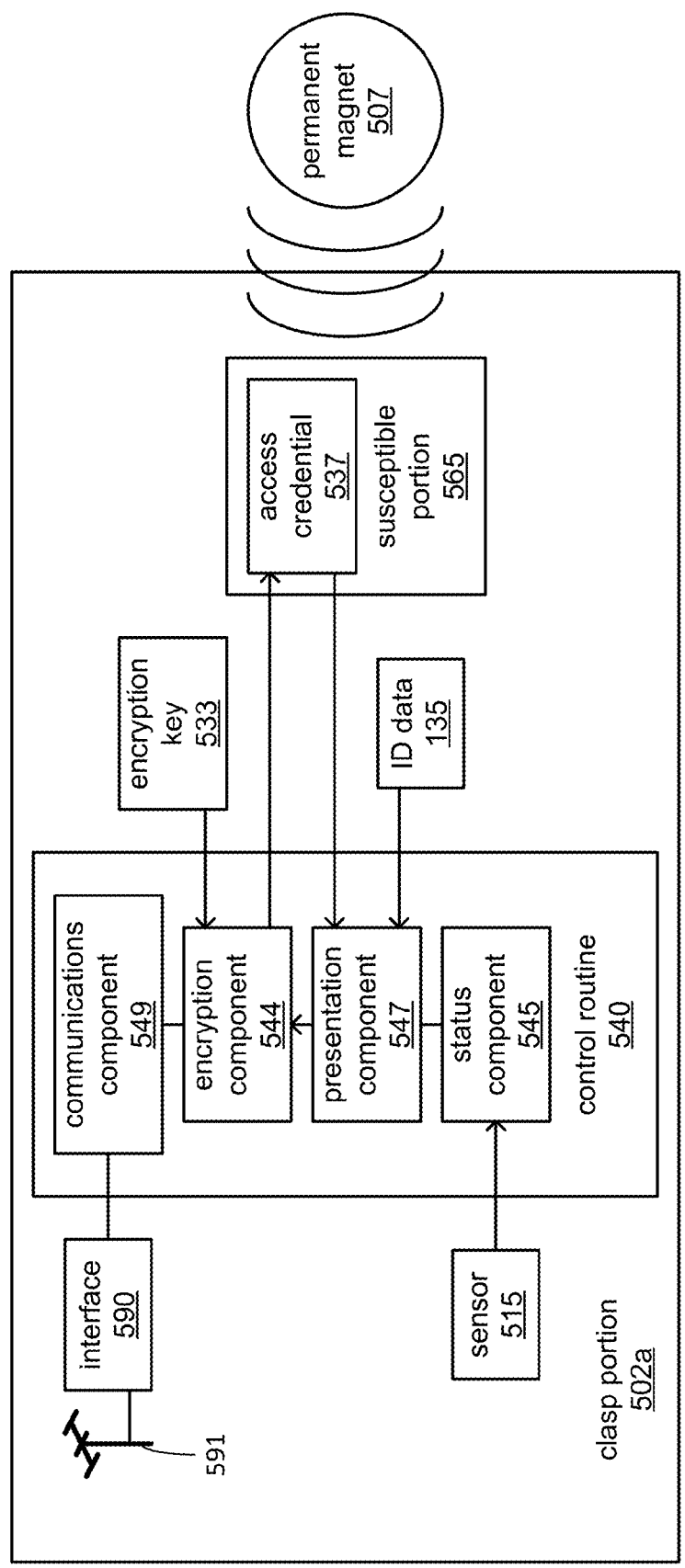
FIGS. 6A and 6B, together, illustrate an example embodiment of a wearable device.
Figure 6B:
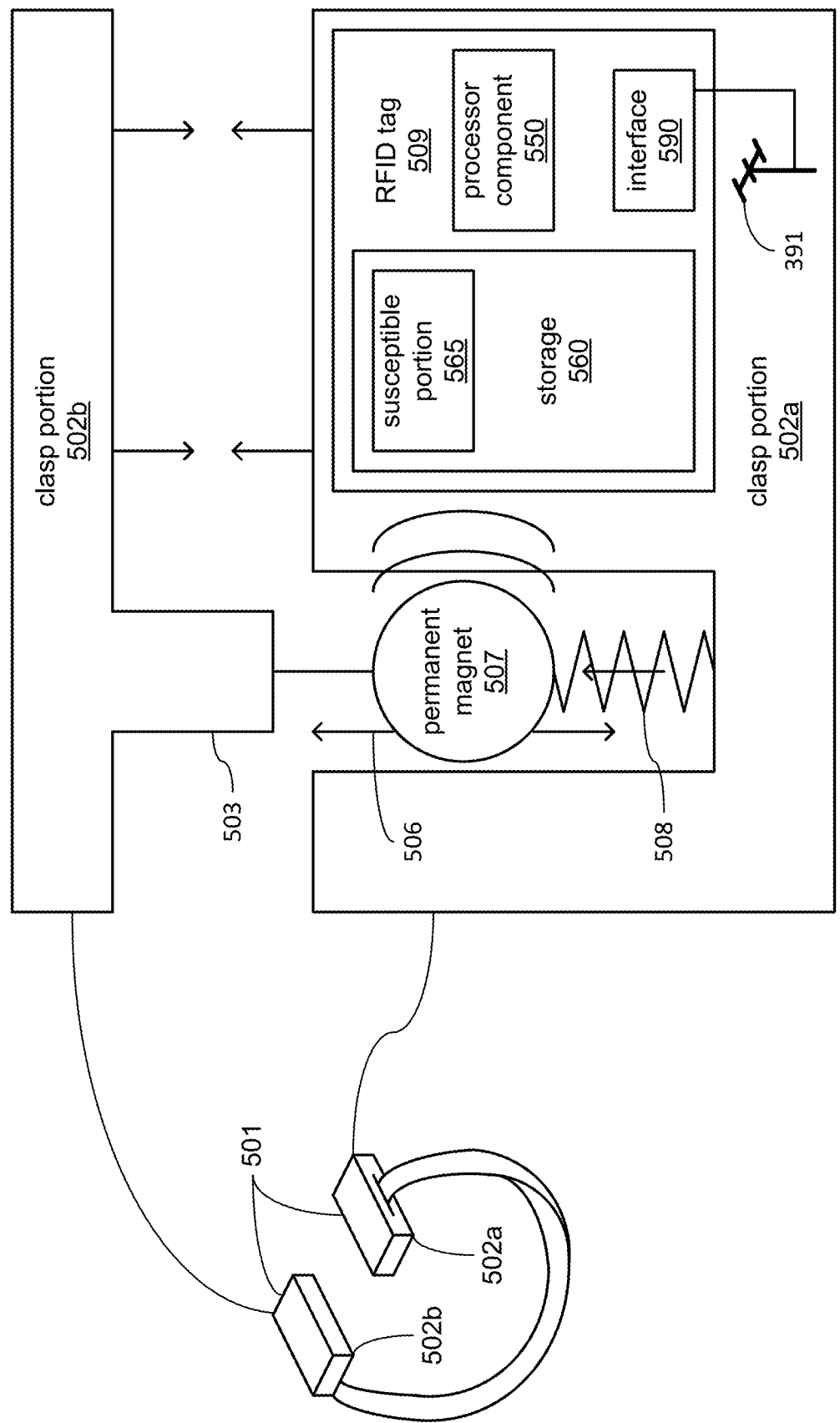
Figure 7A:
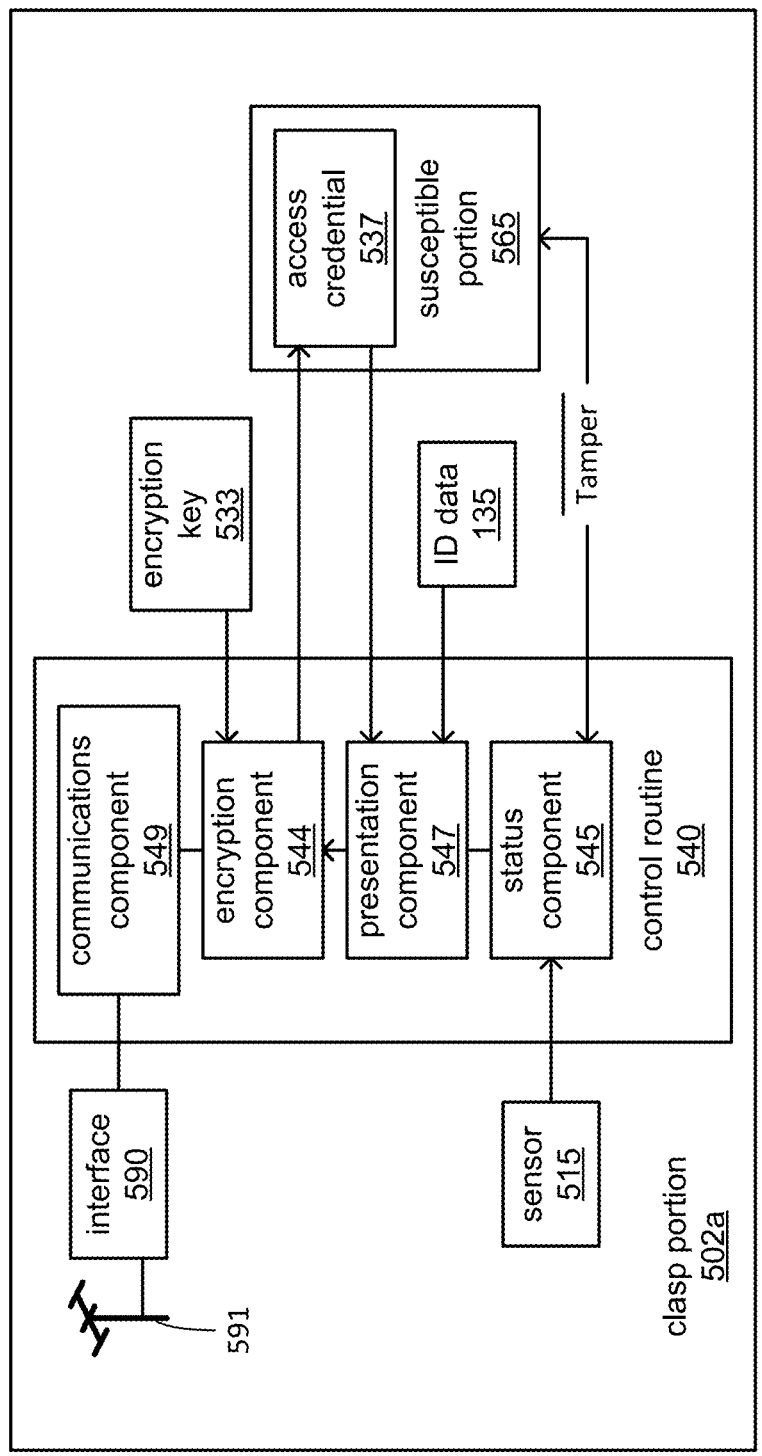
FIGS. 7A and 7B, together, illustrate another example embodiment of a wearable device.
Figure 7B:
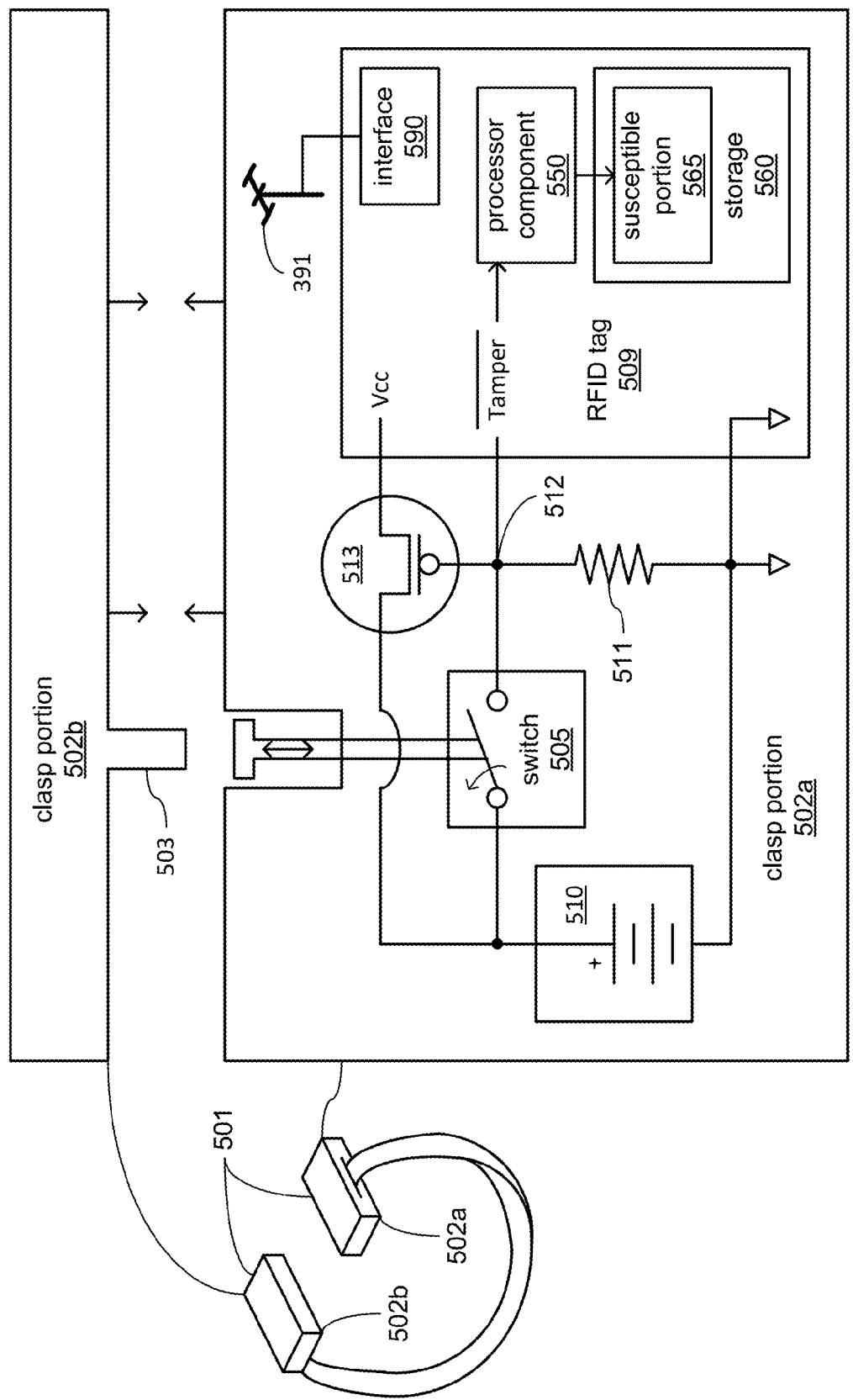

FIGS. 4, 5, 6A-B and 7A-B each illustrate a block diagram of a portion of an embodiment of the access control system 1000 of FIG. 1 in greater detail. More specifically, FIG. 4 depicts aspects of the operating environment of an example embodiment of an initialization device 300 in which the processor component 350, in executing the control routine 340, selectively provides an access credential 537 to a wearable device 500. FIG. 5 depicts aspects of the operating environment of an example embodiment of an access device 700 in which the processor component 750, in executing the control routine 740, attempts to verify the security credential 537 provided to a wearable device 500 to determine whether to grant access to a secured item 800. FIGS. 6A-B depict aspects of the operating environment of an example embodiment of a wearable device 500 in which the processor component 550, in executing the control routine 540, exchanges and selectively maintains the security credential 537. FIGS. 7A-B depict aspects of the operating environment of an alternate example embodiment of a wearable device 500 in which the processor component 550, in executing the control routine 540, exchanges and selectively maintains the security credential 537. As recognizable to those skilled in the art, the control routines 340, 540 and 740, including the components of which each is composed, are selected to be operative on whatever type of processor or processors that are selected to implement applicable ones of the processor components 350, 550 or 750.

In various embodiments, each of the control routines 340, 540 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350, 550 or 750. Where one or more device drivers are included, those device drivers may provide support for any of a variety of other components, whether hardware or software components, of corresponding ones of these computing devices 300, 500 or 700.

Turning more specifically to FIGS. 4-5, 6A and 7A, the control routines 340, 540 and 740 may each include a communications component 349, 549 and 749, respectively, executable by corresponding ones of the processor components 350, 550 and 750 to operate corresponding ones of the interfaces 390, 590 and 790 to transmit and receive signals via the network 999 and/or via NFC. Among those signals may be signals conveying various security credentials (e.g., device identifiers, encryption keys, access credentials, etc.) as has been described. Further, each of the communications components 349 and 749 may operate corresponding ones of the interfaces 390 and 790 to generate an electromagnetic field to wirelessly convey electric power to a wearable device 500 within a relatively short distance of the antenna 391 and 791, respectively, as has also been described. Correspondingly, the communications component 549 may operate the interface 590 to receive such wirelessly conveyed electric power from such an electromagnetic field. As will be recognized by those skilled in the art, each of these communications components is selected to be operable with whatever type of interface technology is selected to implement corresponding ones of the interfaces 390, 590 or 790.

The control routines 340, 540 and 740 may each include an encryption component 344, 544 and 744, respectively, executable by corresponding ones of the processor components 350, 550 and 750 to encrypt and/or decrypt various security credentials (e.g., device identifiers, encryption keys, access credentials, etc.) exchanged among the computing devices 300, 500 and 700 via NFC as has been described. During provisioning of the initialization device 300 and/or of the access device 700 from the provisioning server 100 via the network 999 in preparation for use, each may be provided with the encryption key 335 for the encryption routines 344 and 744 to use in encrypting and decrypting security credentials that may be encrypted or decrypted by the encryption routine 544 of each of the wearable devices 500 using one of the encryption keys 533. As has been discussed, each of the wearable devices 500 may be provisioned with one of the encryption keys 533 during its manufacture.

Turning more specifically to FIGS. 4-5, the control routines 340 and 740 may each include a verification component 345, respectively, executable by corresponding ones of the processor components 350 and 750 to employ one or more security credentials with which each of the initialization device 300 and the access device(s) 700 have been provisioned to verify one or more security credentials received via NFC (e.g., device identifiers, access credentials, etc.), via manually operable controls (e.g., account name, password, etc.) and/or via biometric sensor (e.g., a fingerprint, a voice sample, an image of a face, etc.). Each of the verification components 345 and 745 may then determine a next action to take in response to the results of such verification, as has been described.

The verification component 345 may employ the account data 333 to verify an identifier received from one of the wearable devices 500 via NFC and/or the identity of a person using either manually operable controls or a biometric sensor to log into the initialization system 300. The account data 333 may include listings of all persons 600 that may be authorized to access one or more secured items 800 in the access control system 1000, along with account names (which may be the names of those persons), passwords, images of fingerprints, images of faces or indications of facial characteristics, samples of voices or indications of voice characteristics, images of retinal vascular patterns, etc. The account data 333 may further include identifiers of wearable devices 500 authorized for use as part of the access control system 1000, and may correlate individual ones of those identifiers to individual persons 600, thereby by indicating which wearable device 500 is assigned for use by which person 600.

The verification component 345 may determine whether to provide one of the access credentials 537 to that wearable device 500 based on the results of a combination of verifications. Specifically, if the person 600 is verified as authorized to be granted access to one or more secured items 800, if the wearable device 800 is verified as authorized to be used as part of the access system 1000, if the wearable device 500 is verified as having been assigned to that particular person 600, and/or if (to the degree possible) the wearable device 800 is verified as currently being worn by the person 600, then the verification component 745 may determine that the wearable device 500 is to be provided with one of the access credentials 537. The verification component 345 may then signal an assignment component 347 of the control routine 340 to cooperate with the encryption component 344 and the communications component 349 to provide that wearable device 500 with one of the access credentials 537.

In some embodiments, the assignment component 347 may randomly select one of the access credentials 537 each time it is so signaled to provide one to a wearable device 500. However, in other embodiments where the selection of which access credential 537 to transmit conveys information such as a restriction on the amount of time the access credential 537 remains valid, the assignment component 347 may select one of the access credentials to transmit based on an indication of an applicable restriction from the verification component 345.

As part of verification of at least the person 600 either from manual input via the control 320 or biometric input via the sensor 315, the verification component 345 may cooperate with a user interface (UI) component 348 to operate the controls 320 and/or the display 380 to guide the person 600 through such verification. By way of example, the display 380 and controls 320 may be operated together by the UI component 348 to specifically request a combination of account name and password. Alternatively, the UI component may operate the display 380 to guide the person 600 through use of the sensor 315 to provide a fingerprint, a retinal scan, a facial image or voice input via the sensor 315, depending on the type of biometric information the sensor 315 is designed to capture. Further, during verification of whether the person 600 is currently wearing the wearable device 500, the UI component 348 may operate the controls 320 and the display 380 to either ask the person 600 to manually confirm that they are wearing the wearable device 500 and/or to instruct the person 600 to put it on or make sure they've put it on with the clasp in the clasped state.

The verification component 745 may employ the access credential 735 to verify the access credential 537 received from one of the wearable devices 500 via NFC, and may determine whether to act to grant access to the secured item 800 based on the results of that verification. If the verification was successful, then the verification component 745 may signal an access component 747 of the control routine 740 to grant access to the secured item 800 (e.g., by unlocking a lock) and/or signaling the secure item 800 to grant access.

Turning more specifically to FIGS. 6A-B and 7A-B, two example embodiments of the wearable device 500 are depicted. FIGS. 6A-B, together, depict an example embodiment in which the access credential 537 is stored within a susceptible portion 565 of the storage 560 that is susceptible to having its contents erased or at least altered by exposure to a magnetic field of sufficient strength. FIGS. 7A-B, together, depict an example embodiment in which the access credential 537 is stored within a susceptible portion 565 of the storage that is susceptible to having its contents erased in response to loss of electric power and/or action by the processor component 550 in response to loss of electric power.

Turning to FIGS. 6A-B, the storage 560, the processor component 550 and/or the interface 590 may be incorporated into a RFID tag 509 that, in turn, may be incorporated into a clasp portion 502a of the clasp 501 along with a permanent magnet 507. Operation of the clasp 501 into a clasped state in which the clasp portion 502a is brought together with a clasp portion 502b of the clasp 501 may cause the permanent magnet 507 to be moved away from at least the susceptible portion 565 of the storage 560, and thereby allow the access credential 537 to be stored therein and to remain intact as stored therein.

As depicted, a spring 508 also incorporated into the clasp portion 502a may tend to urge the permanent magnet 507 along a path of travel 506 towards a position closer to at least the susceptible portion 565. While the clasp 501 is operated into an unclasped state, there may be nothing to stop the permanent magnetic 507 from being so urged along the path of travel 506 to such a position closer to at least the susceptible portion 565, thereby causing at least alteration of the contents thereof, if not erasure of all of the contents thereof such that nothing stored within the susceptible portion 565 may remain intact. However, when the clasp 501 is operated into a clasped state, a tab 503 carried by the tab portion 502b may engage the permanent magnet 507 and move it along the path of travel 506 in opposition to the force exerted on the permanent magnet 507 by the spring 508 and towards another position further away from at least the susceptible portion 565. With the permanent magnet so moved away from at least the susceptible portion 565, the magnetic field from the permanent magnet 507 at the location of the susceptible portion 565 is significantly reduced, thereby enable the contents stored therein to remain intact.

Turning to FIGS. 7A-B, the storage 560, the processor component 550 and/or the interface 590 may again be incorporated into a RFID tag 509 that, in turn, may be incorporated into a clasp portion 502a of the clasp 501 along with a normally open switch 505 and the power source 510. Operation of the clasp 501 into a clasped state in which the clasp portion 502a is brought together with a clasp portion 502b of the clasp 501 may cause an alternate embodiment of the tab 503 to engage the switch 505 to thereby close the switch 505 and thereby complete a circuit through which electric power is provided by the power source 510 to the processor component 550 and/or the susceptible portion 565 of the storage 560, and to thereby allow the access credential 537 to be stored therein and to remain intact as stored therein.

More specifically, closure of the switch 505 as a result of being engaged by the tab 503 during a clasped state of the clasp 501 enables a higher voltage of the positive terminal of the power source 510 to be presented at the gate of a transistor 513 through a node 512 that also serves as a "-Tamper" signal input to the processor component 550. As long as the switch 505 remains closed, the transistor is thereby triggered to an "on" state by which it conducts electric current therethrough from the positive terminal of the power supply 510 to a Vcc input of the RFID tag 509, and correspondingly, current flow returns to the negative terminal of the power supply from a ground connection of RFID tag 509. However, when the clasp 501 is operated into an unclasped state in which the clasp portions 502a and 502b are separated, the tab 503 may cease to engage the switch 505, thereby allowing the switch 505 to return to its normally open status such that it ceases to conduct electric current therethrough and the gate of the transistor 513 and the -Tamper input of the RFID tag 509 are no longer presented with the higher voltage of the positive terminal of the power source 501 via the node 512.

Instead, a resistor 511 that couples the node 512 to the negative terminal of the power source 510 is able to rapidly pull the voltage level at the node 512 down to the lower voltage level of the negative terminal of the power source 510, changing the voltage level at the -Tamper input and at the gate of the transistor 513 from the higher voltage level to the lower voltage level. As a result of the change in voltage level at the node 512, the transistor 513 begins to change from an "on" state in which electric current is conducted from the positive terminal of the power source to the Vcc input of the RFID tag 509 to an "off" state in which such an electric current is not conducted (or is at least greatly reduced). However, as recognizable to those skilled in the art, some amount of time may be required for the transistor 513 to fully transition from the "on" state to the "off" state such that there remains a residual, though diminishing, amount of electric power that continues to be provided to the RFID tag 509 during that transition. While that residual amount of electric power is still provided to the processor component 550, the processor component 550 may respond to the change of the -Tamper input to a lower voltage level by accessing at least the susceptible portion 565 of the storage 560 and altering or erasing at least a portion of the access credential 537 stored therein such that it is no longer intact. Alternatively or additionally, a bit may be set or reset and/or stored within a register of the processor component 550 and/or within a storage location of the storage 560 to serve to mark the occurrence of this change in the state of the -Tamper input indicating that an instance of the clasp 501 being operated from the clasped state to an unclasped state has occurred since the access credential 537 was received and stored.

Turning now to FIGS. 6A and 7A, the control routine 540 of each of the two example embodiments of the wearable device 500 of FIGS. 6A-B and of FIGS. 7A-B may include a presentation component 547 for execution by the processor component 550 to selectively cause the transmission of the identifier assigned to the wearable device 500 and/or the access credential 537. More specifically, the presentation component 547 may select which of the identifier and the access credential 537 to transmit based on one or more conditions.

As previously discussed, prior to normal use, each of the wearable devices 500 may be provisioned with a unique identifier that may be stored as at least part of the ID data 135 within each of the wearable devices 500. In response to the receipt of electric power conveyed by an electromagnetic field, the presentation component 547 may retrieve the identifier of the wearable device 500 from the ID data 135 and may cooperate with the encryption component 544 and the communications component 549 to transmit the identifier. In some embodiments, the presentation component 547 may always respond to the commencement of receipt of electric power conveyed by an electromagnetic field by effecting the transmission of at least the identifier. However, in other embodiments, the presentation component 547 may refrain from transmitting the identifier, and instead, cooperate with the encryption component 544 and the communications component 549 to transmit the access credential 537 at times when the access credential 537 has been received, stored and there is no indication of the clasp 501 having been operated to an unclasped state since such receipt and storage.

To determine whether or not the clasp 501 has changed status by being operated from a clasped state to an unclasped state since the receipt and storage of the access credential 537, the presentation component 547 may perform a test of the access credential 537 to determine whether it is intact. Again, at the time the access credential 537 was received from the initialization device 300 through the communications component 549, decrypted by the encryption component 544 (using the encryption key 533) and stored within the storage 560, a checksum calculation may have been performed to derive a checksum value. In later performing a test of the access credential 537 as part of determining whether the access credential 537 is still intact for transmission, the presentation component 547 may repeat the same checksum calculation on the access credential 537 as stored within the storage 560, and may compare the results to the earlier results. If the results of both performances of the checksum calculation match, then the access credential 537 may be deemed to be intact by the presentation component 547, and the presentation component 547 may effect the transmission of the access credential 537 in lieu of the identifier for the wearable device 500. Such a performance of a test of the access credential 537 may be performed by the processor component 550 of the embodiment of FIGS. 6A-B in which there may not be a switch (e.g., the switch 505 of the embodiment of FIGS. 7A-B) to detect unclasping.

Alternatively or additionally, to determine whether or not the clasp 501 has changed status by being operated being operated from a clasped state to an unclasped state since the receipt and storage of the access credential 537, the presentation component 547 may retrieve an indication from a status component 545 of the control routine 540 as to whether the clasp 501 has been detected as having been operated to an unclasped state since receipt and storage of the access credential 537. As depicted in FIG. 7A for the example embodiment of FIGS. 7A-B, the status component 545 may be coupled to and monitor an output of a switch where the state of that switch is altered by clasping and unclasping (e.g., the switch 505).

In embodiments of the wearable device 500 that include the sensor 515 to detect whether the wearable device 500 is currently being worn, the status component 545 may also provide the presentation component 547 with an indication of whether the wearable device 500 is so detected as current being worn, or not. The presentation component 547 may cause an indication of one or both of the current state of the clasp 501 and/or whether the wearable device 500 is currently being worn to be transmitted along with the identifier.

In embodiments of the wearable device 500 that include the power source 510 and the switch 505, the status component 545 may monitor the status of the clasp 501 by continuously monitoring the status of the switch 505 coupled to the clasp 501. In the example embodiment of FIGS. 7A-B, the status component 545 may monitor the state of the node 512 (e.g., the -Tamper input). Upon detecting a change in state of the switch 505 indicating that the clasp 501 has been operated from a clasped state to an unclasped state, the status component 545 may access at least a portion of the susceptible portion 565 to alter at least a portion of the access credential 537 to at least the extent of corrupting it, if not erasing it entirely. In various embodiments, the status component 545 may effect nullification of the access credential 537 by performing one or more write operations to overwrite at least a portion of the access credential 537, signaling the storage 560 to itself erase at least a portion of the susceptible portion 565 to alter at least a portion of the access credential 537, or store an indication elsewhere within the storage 560 (e.g., a bit value) that the clasp 501 has been operated to an unclasped state. Where operation of the clasp 501 to an unclasped state results in loss of the provision of electric power from the power source 510 to the processor component 550 and/or the storage 560, a residual amount of power that may be provided by one or more components in such a circuit as depicted in FIG. 7B for a relatively short period of time immediately following operation of the clasp 501 to the unclasped state may be used to perform such overwriting, signaling to erase and/or marking.

In various embodiments, each of the processor components 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360, 560 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of each of the interfaces 390, 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
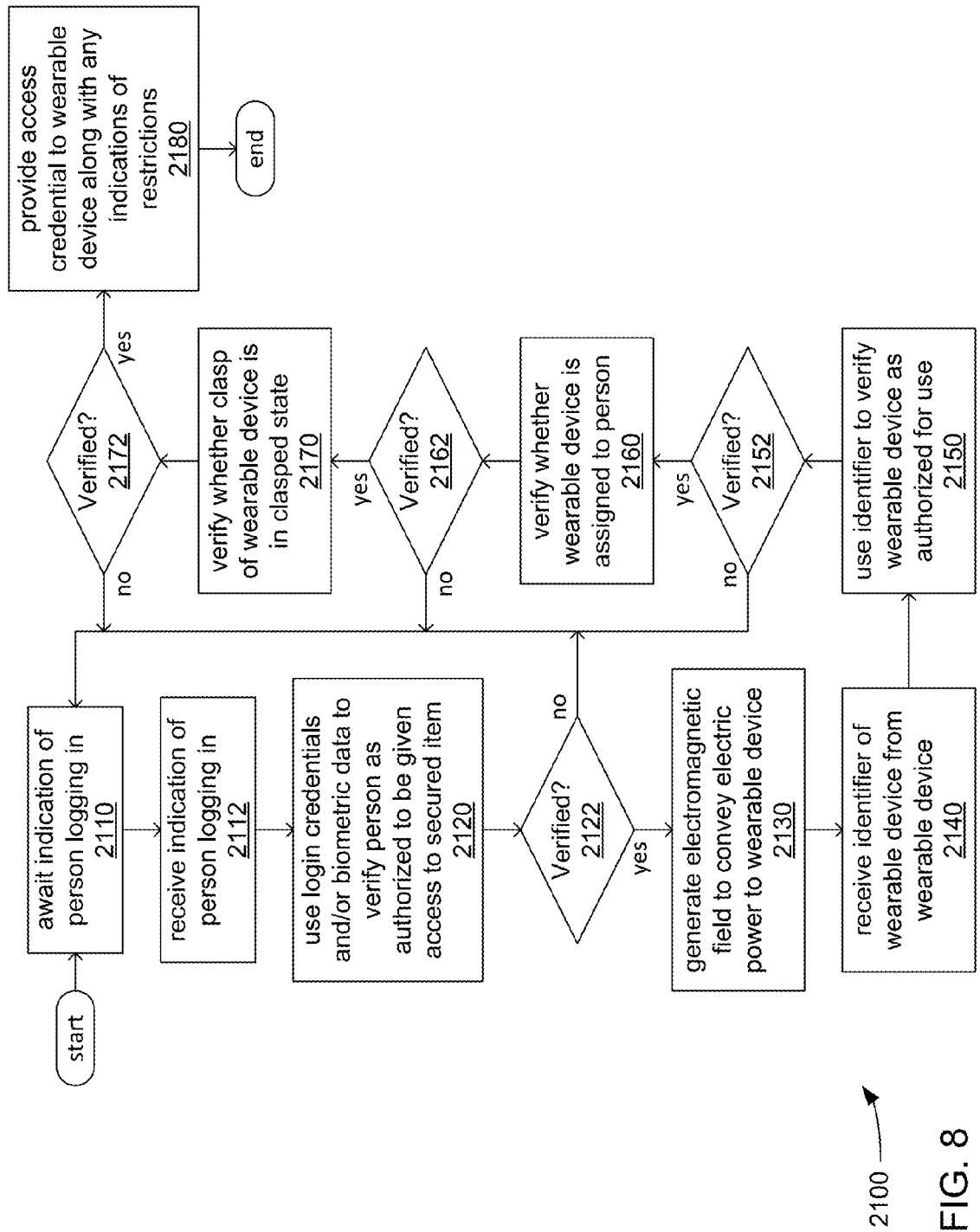
FIGS. 8, 9 and 10 each illustrate a logic flow according to an embodiment.

FIG. 8 illustrates an embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the initialization device 300. In particular, the logic flow 2100 is focused on operations to initialize a wearable device 500 for use in greater detail.

At 2110, a processor component of an initialization device (e.g., the processor component 350 of the initialization device 300) awaits an indication of a person logging in. As previously discussed, such an indication may be operation of manually operable controls of the initialization device to manually enter security credentials (e.g., an account, password, etc.) by that person or the receipt of biometric data (e.g., fingerprint, voice sample, facial image, etc.) captured as a result of that person using a biometric sensor of the initialization device. At 2112, the processor component receives such an indication.

At 2120, the processor component may use the received credentials from the log in by the person (whether manually entered or as a result of biometric capture) to verify the person as being authorized to be granted access to a secured item that is secured by the access control system to which the initialization device belongs (e.g., the access control system 1000). If the person is not able to be so verified at 2122, then the processor component may return to awaiting an indication of a person logging in at 2110.

However, if the person is successfully verified, then at 2130, the processor component may operate an interface (e.g., the interface 390) to generate an electromagnetic field to convey electric power to a wearable device (e.g., one of the wearable devices 500) that the person may have brought with them and may have put within a relatively short distance of the antenna of the initialization device (e.g., the antenna 391). As previously discussed, in response to such wireless conveyance of electric power to such a wearable device, the wearable device may transmit its unique identifier back to the initialization device. The initialization device may so receive that unique identifier at 2140.

At 2150, the processor component may use the received identifier to verify the wearable device as being authorized to be used as part of the access control system. If the wearable device is not able to be so verified at 2152, then the processor component may return to awaiting an indication of a person logging in at 2110.

However, if the wearable device is successfully verified, then at 2160, the processor component may use both the security credentials provided by the person and the identifier of the wearable device to verify that particular wearable device as assigned to that particular person. If the wearable device is not able to be so verified at 2162, then the processor component may return to awaiting an indication of a person logging in at 2110.

However, if the wearable device is successfully verified, then at 2170, the processor component may attempt to verify whether the clasp of the wearable device is currently in a clasped state. As previously discussed, in embodiments in which the wearable device is able to detect whether the clasp is currently in a clasped or unclasped state, the wearable device may directly indicate that to the initialization device in a transmission. Also, the wearable device may be able to further indicate in a transmission whether or not it is currently being worn.

However, in embodiments in which the wearable device does not have such capabilities, the initialization device may operate controls and/or a display to request the person to provide verification themselves as to whether they are currently wearing the wearable device and/or whether or not the clasp is currently in the clasped state. If the state of at least the clasp of the wearable device is not able to be so verified at 2172, then the processor component may return to awaiting an indication of a person logging in at 2110.

However, if the current state of the clasp of the wearable device is successfully verified as in the clasped state and/or if the wearable device is successfully verified as currently being worn, then the processor component may operate the interface to transmit an access credential to the wearable device at 2180. As has also been discussed, the access credential may be incorporate or be otherwise accompanied by an indication of any temporal or other restrictions on access to one or more secured items. As has also been discussed, such an indication of restrictions may be communicated by the choice of the access credential from among multiple available access credentials.

Figure 9:
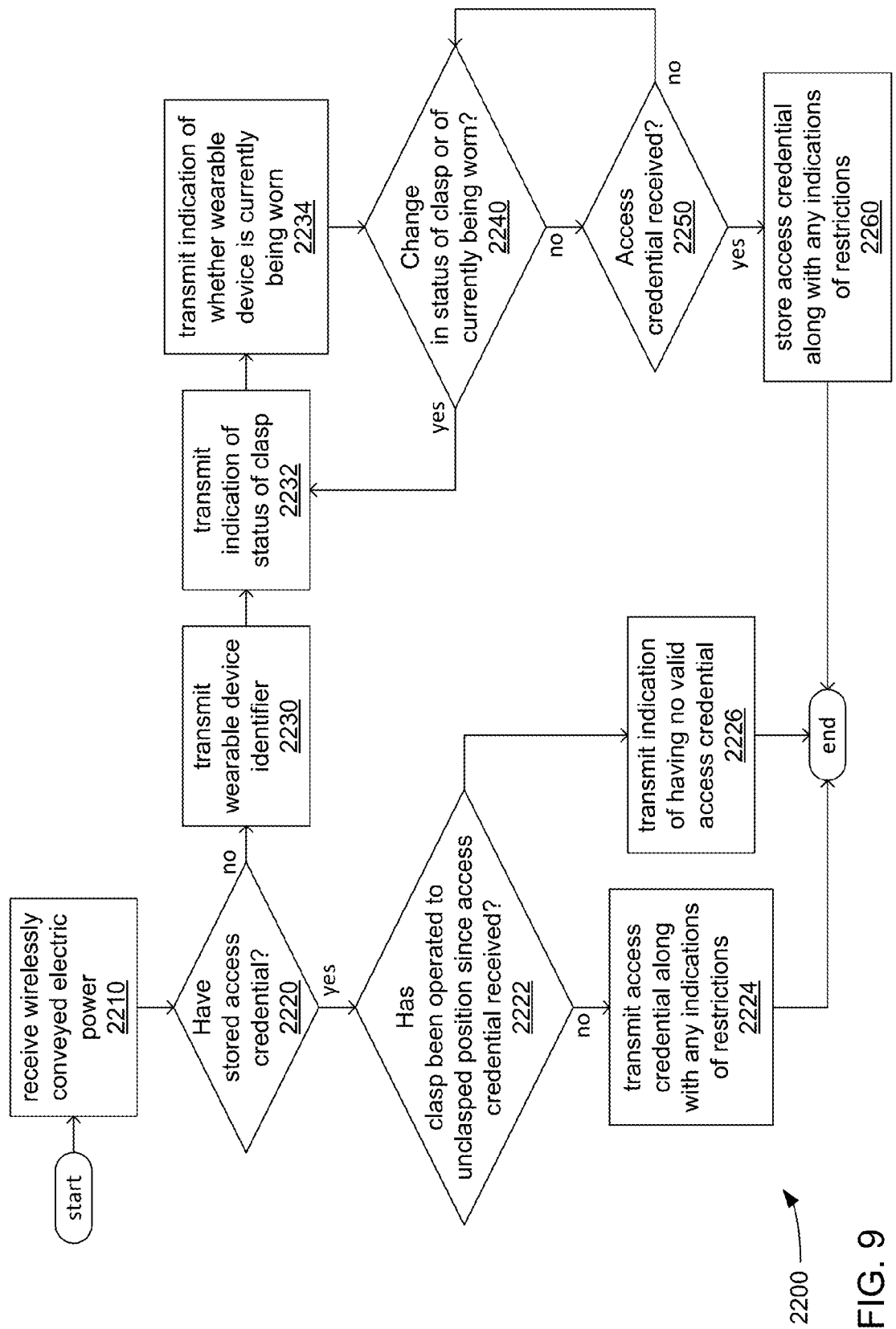

FIG. 9 illustrates an embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of one of the wearable devices 500. In particular, the logic flow 2200 is focused on operations to initialize and use a wearable device 500 for use in greater detail.

At 2210, a processor component of a wearable device (e.g., the processor component 550 of one of the wearable devices 500) receives electric power conveyed to it via an electromagnetic field. Again, this electromagnetic field to convey electric power to the wearable device may emanate from either an initialization device or one of the access devices (e.g., the initialization device 300 or one of the access devices 700).

At 2220, the processor component may check whether an access credential is currently stored within the wearable device. If so, then the processor component may check whether a clasp of the wearable device (e.g., the clasp 501) has been operated from its clasped state to an unclasped state at 2222 since reception and storage of the access credential. If not, then the access credential stored within the wearable device may be deemed to still be valid (e.g., as yet, not nullified), and the processor component may transmit the access credential at 2224. However, if the clasp has been operated to an unclasped state since reception and storage of the unclasped credential, then the processor component may transmit an indication of that at 2226.

However, if at 2220, there is currently no access credential stored within the wearable device, then the processor component may transmit an identifier uniquely assigned to the wearable device at 2230. The processor component may accompany that transmission with the transmission of an indication of the current status of the clasp at 2232 and/or an indication of whether or not the wearable device is currently being worn at 2234.

At 2240, the processor component may check whether the status of the clasp has changed, or whether there is a change in whether or not the wearable device is currently being worn. If either has changed, then the processor component may again transmit the current status of the clasp at 2232. However, if status of the clasp has not changed, and there has been no change in whether or not the wearable device is currently being worn, then the processor component may check whether an access credential has yet been received at 2250.

If an access credential has not yet been received at 2250, then the processor component may repeat its check at 2240. However, if an access credential has been received at 2250, then the processor component may store the access credential within a portion of a storage of the wearable device that is susceptible to having its contents altered and/or erased with a magnetic field from a permanent magnet or in response to deprivation of electric power from a power source of the wearable device at 2260. Further, if the access credential is received along with indications of restrictions on the granting of access to one or more secured items, then indications of those restrictions may be stored along with the access credential.

Figure 10:
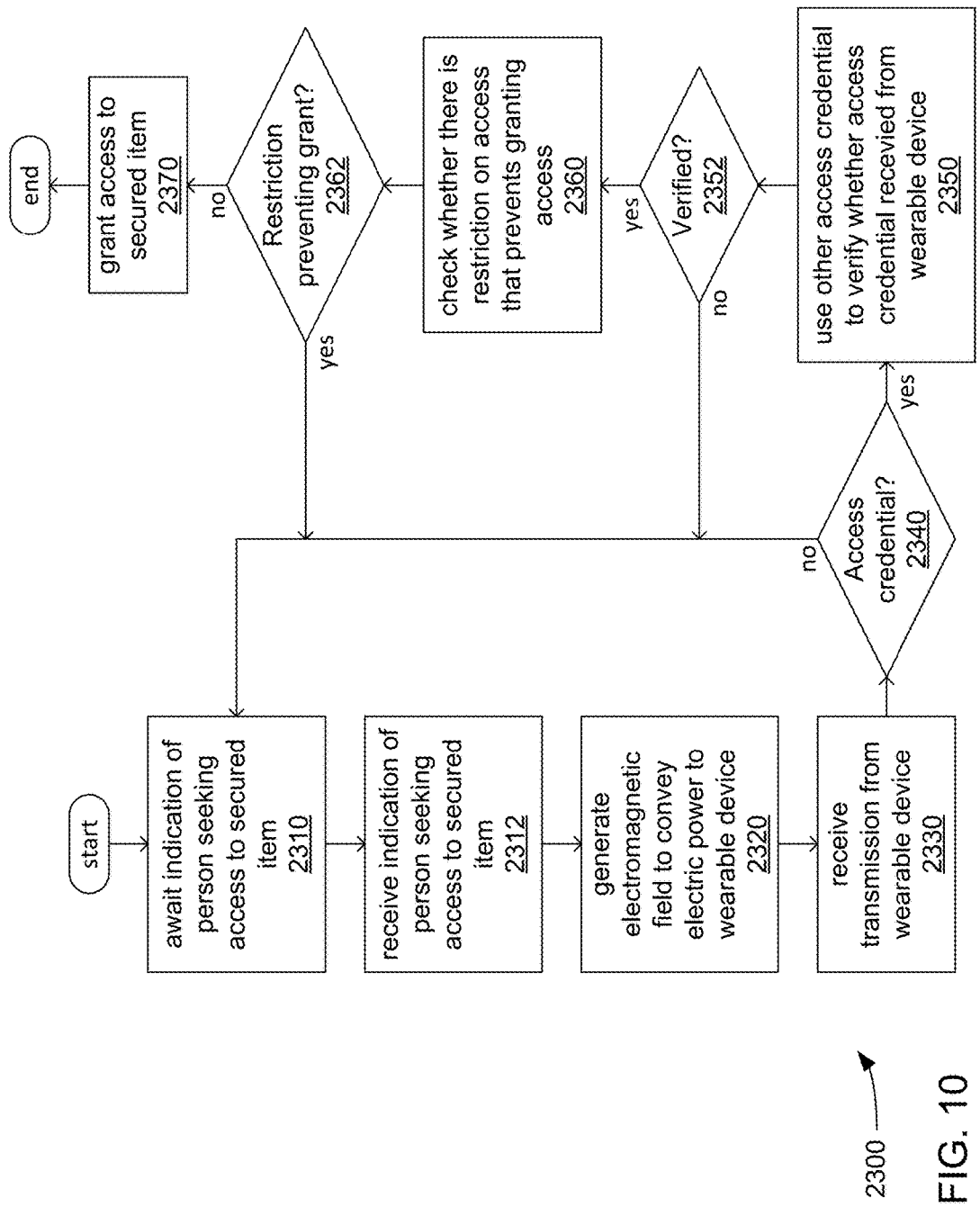

FIG. 10 illustrates an embodiment of a logic flow 2300. The logic flow 2300 may be representative of some or all of the operations executed by one or more embodiments described herein. More specifically, the logic flow 2300 may illustrate operations performed by the processor component 750 in executing at least the control routine 740, and/or performed by other component(s) of one of the access devices 700. In particular, the logic flow 2300 is focused on operations to verify an access credential received from a wearable device 500.

At 2310, a processor component of an access device (e.g., the processor component 750 of the access device 700) awaits an indication of a person seeking access to a secured item to which the access device controls access. As previously discussed, such an indication may be attempted operation of manually operable controls of the secured item such that the secured item signals the access device of the attempted use. At 2312, the processor component receives such an indication.

At 2320, the processor component may operate an interface (e.g., the interface 790) to generate an electromagnetic field to convey electric power to a wearable device (e.g., one of the wearable devices 500) that the person may have brought with them and may have put within a relatively short distance of the antenna of the access device (e.g., the antenna 791). As previously discussed, in response to such wireless conveyance of electric power to such a wearable device, the wearable device may transmit an access credential stored therein (if there is one stored therein), or may transmit an indication of not having a valid access credential stored therein if the clasp was operated to an unclasped position following receipt and storage of the access credential. The access device may so receive a transmission from the wearable device at 2330.

At 2340, the processor component may check whether what has been transmitted by the wearable device and received by the access device is an access credential. If not (as in the case of the transmission of an indication of not having a valid access credential), then the processor component may return to awaiting an indication of a person seeking access to a secured item at 2310.

However, if at 2340, what was received from the wearable device was an access credential, then the processor component may use another access credential with which the access device was earlier provisioned (e.g., via the network 999 from the provisioning server 100) to attempt to verify the access credential received from the wearable device. If the received access credential is not able to be so verified at 2352, then the processor component may return to awaiting an indication of a person seeking access to the secured item at 2310.

However, if at 2352, the access credential is successfully verified, then the processor component may check at 2360 whether there are any restrictions on access to the secured item that prevents granting of access thereto in spite of the access credential being successfully verified. As previously discussed, there may be temporal or other restrictions placed on access to a secured item, such as particular hours of the day or days of the week during which access either may or may not be granted. If there is a restriction prevent access to the secured item, at least at the current time, then the processor component may return to awaiting an indication of a person seeking access to a secured item at 2362.

However, if at 2362, there are no restrictions preventing the granting of access to the secured item, then the processor component may grant such access at 2370. As previously discussed, this may entail the processor component effecting the unlocking of a lock, of the transmission of a signal to the secured item to it to permit the person to use it.

Figure 11:
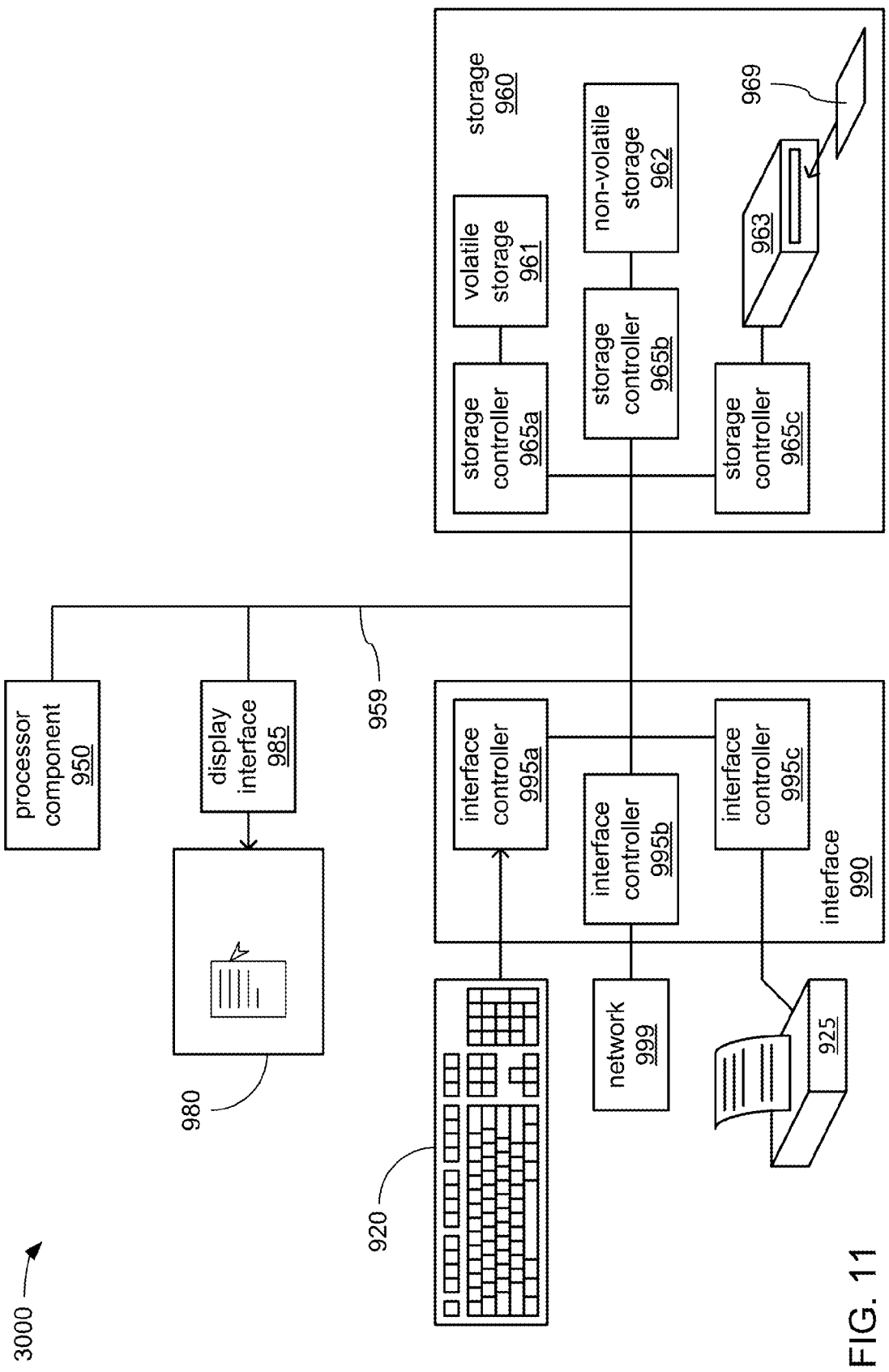
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700. It should be noted that components of the processing architecture 3000 are given reference numbers in which the last two digits correspond to the last two digits of reference numbers of at least some of the components earlier depicted and described as part of the computing devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 550 and 750) may include any of a wide variety of commercially available processors, employing any of a wide variety of technologies and implemented with one or more cores physically combined in any of a number of ways.

As previously discussed, the storage 960 (corresponding to the storages 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 390, 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component; a storage accessible to the processor component to store an access credential; a presentation component to retrieve the access credential from the storage and to send the access credential to an access device to enable a grant of access to a secured item; a power source; and a clasp coupled to a wearable portion to prevent removal of the wearable portion unless the clasp is operated to change state from a clasped state to an unclasped state, the clasp to cause loss of electric power from the power source to the processor component and the storage when in the unclasped state to nullify the access credential.

In Example 2, which includes the subject matter of Example 1, the apparatus may include the wearable portion, and the wearable portion may be sized and shaped to be worn about a portion of a body of a person.

In Example 3, which includes the subject matter of any of Examples 1-2, the apparatus may include an antenna and an interface to couple the processor component to the antenna to provide the processor component with electric power conveyed to the antenna via an electromagnetic field to execute the presentation component, and the presentation component may cooperate with the interface to transmit the access credential via NFC.

In Example 4, which includes the subject matter of any of Examples 1-3, the presentation component may condition transmission of the access credential on whether the clasp has changed state from the clasped state to the unclasped state following receipt of the access credential via NFC and storage of the access credential within the storage.

In Example 5, which includes the subject matter of any of Examples 1-4, the apparatus may include an antenna and an interface to couple the processor component to the antenna to provide the processor component with electric power conveyed to the antenna via an electromagnetic field to execute the presentation component, and the presentation component may retrieve an identifier from the storage and to cooperate with the interface to transmit the identifier to an initialization device via NFC to obtain the access credential.

In Example 6, which includes the subject matter of any of Examples 1-5, the apparatus may include a status component to monitor the state of the clasp and to cooperate with the interface to transmit an indication of the state of the clasp to the initialization device via NFC.

In Example 7, which includes the subject matter of any of Examples 1-6, the apparatus may include a sensor to detect whether the wearable portion is current worn about a portion of a body of a person; and a status component to monitor the sensor and to cooperate with the interface to transmit an indication of whether the wearable portion is currently worn to the initialization device via NFC.

In Example 8, which includes the subject matter of any of Examples 1-7, the apparatus may include an encryption component to encrypt the access credential prior to transmission of the access credential, to decrypt the access credential following receipt of the access credential and prior to storage of the access credential within the storage, and to encrypt the identifier prior to transmission of the identifier.

In Example 9, which includes the subject matter of any of Examples 1-8, the apparatus may include a transistor to cooperate with the power source and the clasp to provide a residual amount of electric power to the processor component and the storage for a relatively short period of time after the clasp is operated to change state from the clasped state to the unclasped state; and a status component to monitor the state of the clasp and to use the residual amount of electric power to alter at least a portion of the access credential within the storage during the relatively short period of time.

In Example 10, which includes the subject matter of any of Examples 1-9, the status component may use the residual amount of electric power to access the storage to overwrite the at least a portion of the access credential during the relatively short period of time.

In Example 11, which includes the subject matter of any of Examples 1-10, the power source may include at least one of a battery, a solar cell, a generator to generate electric power from thermal energy output by a body of a person, or a generator to generate electric power from movement of a portion of a body of a person.

In Example 12, an apparatus includes a processor component; a storage accessible to the processor component to store an access credential, the storage susceptible to exposure to a magnetic field to nullify the access credential by at least partial erasure of the access credential within the storage; a presentation component to retrieve the access credential from the storage and to send the access credential to an access device to enable a grant of access to a secured item; and a clasp coupled to a wearable portion to prevent removal of the wearable portion unless the clasp is operated to change state from a clasped state to an unclasped state, the clasp to move a magnet toward the storage to increase exposure of the storage to a magnetic field of the magnet in the unclasped state and to move the magnet away from the storage to decrease exposure to the magnetic field of the magnet in the clasped state.

In Example 13, which includes the subject matter of Example 12, the apparatus may include the wearable portion, and the wearable portion may be sized and shaped to be worn about a portion of a body of a person.

In Example 14, which includes the subject matter of any of Examples 12-13, the apparatus may include an antenna, and an interface to couple the processor component to the antenna to provide the processor component with electric power conveyed to the antenna via an electromagnetic field to execute the presentation component, the presentation component to cooperate with the interface to transmit the access credential via NFC.

In Example 15, which includes the subject matter of any of Examples 12-14, the presentation component may test the access credential to determine whether the access credential has been nullified, and to condition transmission of the access credential on the results of the test.

In Example 16, which includes the subject matter of any of Examples 12-15, the apparatus may include an antenna and an interface to couple the processor component to the antenna to provide the processor component with electric power conveyed to the antenna via an electromagnetic field to execute the presentation component, and the presentation component may retrieve an identifier from the storage and to cooperate with the interface to transmit the identifier to an initialization device via NFC to obtain the access credential.

In Example 17, which includes the subject matter of any of Examples 12-16, the apparatus may include at least one of a switch coupled to the clasp or electrical contacts coupled to the clasp to change a state of a flow of current based on the state of the clasp, and a status component to determine the state of the clasp from the state of the flow of current and to cooperate with the interface to transmit an indication of the state of the clasp to the initialization device via NFC.

In Example 18, which includes the subject matter of any of Examples 12-17, the apparatus may include a sensor to detect whether the wearable portion is current worn about a portion of a body of a person, and a status component to monitor the sensor and to cooperate with the interface to transmit an indication of whether the wearable portion is currently worn to the initialization device via NFC.

In Example 19, which includes the subject matter of any of Examples 12-18, the apparatus may include an encryption component to encrypt the access credential prior to transmission of the access credential, to decrypt the access credential following receipt of the access credential and prior to storage of the access credential within the storage, and to encrypt the identifier prior to transmission of the identifier.

In Example 20, a computing-implemented method includes wirelessly transmitting from a wearable device an access credential retrieved from a storage of the wearable device to an access device to enable a grant of access to a secured item using electric power from an electromagnetic field present at the wearable device; monitoring, at a processing component of the wearable device, a state of a clasp of the wearable device using electric power from a power source of the wearable device, the clasp to prevent removal of the wearable device unless the clasp is operated from a clasped state to an unclasped state, and the clasp to cause loss of electric power from the power source to the processor component when in the unclasped state; and nullifying the access credential within the storage using a residual amount of electric power provided to the processor component from the power source for a relatively short period of time following action by the clasp to cause the loss of electric power to the processor component.

In Example 21, which includes the subject matter of Example 20, the wearable device may be sized and shaped to be worn about a portion of a body of a person, and the clasp may prevent removal of the wearable device from the portion of the body unless the clasp is operated from the clasped state to the unclasped state.

In Example 22, which includes the subject matter of any of Examples 20-21, the method may include transmitting from the wearable device the access credential to the access device via NFC.

In Example 23, which includes the subject matter of any of Examples 20-22, the method may include conditioning transmission of the access credential on whether that clasp has changed state from the clasped state to the unclasped state following receipt of the access credential via NFC and storage of the access credential within the storage.

In Example 24, which includes the subject matter of any of Examples 20-23, the method may include transmitting from the wearable device an identifier of the wearable to an initialization device via NFC to obtain the access credential.

In Example 25, which includes the subject matter of any of Examples 20-24, the method may include monitoring the state of the clasp and transmitting an indication of the state of the clasp to the initialization device via NFC.

In Example 26, which includes the subject matter of any of Examples 20-25, the method may include monitoring a sensor of the wearable device to detect whether the wearable device is currently worn, and transmitting an indication of whether the wearable device is currently worn to the initialization device via NFC.

In Example 27, which includes the subject matter of any of Examples 20-26, the method may include encrypting the access credential prior to transmission of the access credential, decrypting the access credential following receipt of the access credential and prior to storage of the access credential within the storage, and encrypting the identifier prior to transmission of the identifier.

In Example 28, which includes the subject matter of any of Examples 20-27, the method may include overwriting at least a portion of the access credential within the storage during the relatively short period of time using the residual amount of electric power.

In Example 29, at least one machine-readable storage medium includes instructions that when executed by a wearable device, may cause the wearable device to wirelessly transmit an access credential retrieved from a storage of the wearable device to an access device to enable a grant of access to a secured item using electric power from an electromagnetic field present at the wearable device; monitor a state of a clasp using electric power from a power source of the wearable device, the clasp to prevent removal of the wearable device unless the clasp is operated from a clasped state to an unclasped state, and the clasp to cause loss of electric power from the power source to the processor component when in the unclasped state; and nullify the access credential within the storage using a residual amount of electric power provided to the processor component from the power source for a relatively short period of time following action by the clasp to cause the loss of electric power to the processor component.

In Example 30, which includes the subject matter of Example 29, the wearable device may be sized and shaped to be worn about a portion of a body of a person, and the clasp may prevent removal of the wearable device from the portion of the body unless the clasp is operated from the clasped state to the unclasped state.

In Example 31, which includes the subject matter of any of Examples 29-30, the computing device may be caused to transmit the access credential to the access device via NFC.

In Example 32, which includes the subject matter of any of Examples 29-31, the computing device may be caused to condition transmission of the access credential on whether that clasp has changed state from the clasped state to the unclasped state following receipt of the access credential via NFC and storage of the access credential within the storage.

In Example 33, which includes the subject matter of any of Examples 29-32, the computing device may be caused to transmit an identifier of the wearable to an initialization device via NFC to obtain the access credential.

In Example 34, which includes the subject matter of any of Examples 29-33, the computing device may be caused to monitor the state of the clasp and transmit an indication of the state of the clasp to the initialization device via NFC.

In Example 35, which includes the subject matter of any of Examples 29-34, the computing device may be caused to monitor a sensor of the wearable device to detect whether the wearable device is currently worn and transmit an indication of whether the wearable device is currently worn to the initialization device via NFC.

In Example 36, which includes the subject matter of any of Examples 29-35, the computing device may be caused to encrypt the access credential prior to transmission of the access credential, decrypt the access credential following receipt of the access credential and prior to storage of the access credential within the storage, and encrypt the identifier prior to transmission of the identifier.

In Example 37, which includes the subject matter of any of Examples 29-36, the computing device may be caused to overwrite at least a portion of the access credential within the storage during the relatively short period of time using the residual amount of electric power.

In Example 38, at least one machine-readable storage medium may include instructions that when executed by a computing device, cause the computing device to perform any of the above.

In Example 39, an apparatus may include means for performing any of the above.

The invention claimed is:

1. A wearable apparatus comprising:
a clasp operable between a clasped state and an unclasped state, the clasped state to place a switch in a first position and the unclasped state to place the switch in a second position;
a transistor comprising first, second, and third terminals, the first terminal connected in parallel with the switch and a positive terminal of a power source, the second terminal connected to a power input of a processor component, and the third terminal connected in parallel with the switch and a tamper signal input to the processor component;
a memory communicatively coupled with the processor component, the memory comprising data; and
logic, at least a portion of the logic implemented by the processor component, the logic to:
identify a voltage change at the tamper signal input in response to operation of the clasp from the clasped state to the unclasped state; and
alter one or more portions of the data in response to the voltage change.

2. The wearable apparatus of claim 1, operation of the clasp from the clasped state to the unclasped state to cause a voltage drop at the power input to the processor component.

3. The wearable apparatus of claim 2, operation of the clasp from the clasped state to the unclasped state to cause a voltage change at the third terminal, the voltage change at the third terminal to cause the voltage drop at the power input to the processor component.

4. The wearable apparatus of claim 1, the third terminal connected in parallel with a resistor connected to a negative terminal of the power source.

5. The wearable apparatus of claim 1, the logic to erase or overwrite the one or more portions of the data to alter the one or more portions of the data in response to the voltage change.

6. The wearable apparatus of claim 5, the one or more portions of the data comprising access credentials.

7. The wearable apparatus of claim 1, comprising:
an antenna; and
an interface to couple the processor component to the antenna to provide the processor component with electric power conveyed to the antenna via an electromagnetic field.

8. The wearable apparatus of claim 1, comprising:
an antenna; and
an interface to couple the processor component to the antenna, the logic to retrieve an identifier from the memory and cooperate with the interface to transmit the identifier via near field communications (NFC) to an initialization device.

9. The wearable apparatus of claim 8, the logic to receive the data via NFC in response to transmission of the identifier to the initialization device and store the data in the memory.

10. The wearable apparatus of claim 9, the logic to condition transmission of the data on whether the clasp has changed state from the clasped state to the unclasped state following receipt of the data via NFC and storage of the data within the memory.

11. The wearable apparatus of claim 8, the logic to cooperate with the interface to transmit an indication of the state of the clasp to the initialization device via NFC.

12. A method comprising:
measuring a voltage level of a positive terminal of a power source at a tamper input signal of a processor component when a switch is in a first position, the switch connected to a first terminal of a transistor in parallel with the positive terminal of the power source, a second terminal of the transistor connected to a power input of the processor component, and a third terminal of the transistor connected in parallel with the switch and the tamper signal input to the processor component;
determining a clasp is in a clasped state based on the voltage level measured at the tamper input signal of the processor component;
measuring a reference voltage level at the tamper input signal of the processor component in response to operation of the switch into a second position;
determining the clasp is in an unclasped state based on the reference voltage level measured at the tamper input signal of the processor component; and
altering one or more portions of data in a memory communicatively coupled with the processor component in response to determining the clasp is in the unclasped state.

13. The method of claim 12, operation of the clasp from the clasped state to the unclasped state to cause a voltage drop at the power input to the processor component.

14. The method of claim 13, operation of the clasp from the clasped state to the unclasped state to cause a voltage change at the third terminal, the voltage change at the third terminal to cause the voltage drop at the power input to the processor component.

15. The method of claim 12, the third terminal connected in parallel with a resistor connected to a negative terminal of the power source.

16. The method of claim 12, comprising erasing or overwriting the one or more portions of the data to alter the one or more portions of the data in response to the voltage change.

17. The method of claim 16, the one or more portions of the data comprising access credentials.

18. The method of claim 12, comprising providing the processor component with electric power conveyed to an antenna via an electromagnetic field, the antenna coupled to the processor component via an interface.

19. At least one non-transitory computer-readable medium comprising a set of instructions that, in response to being executed by a processor component, cause the processor component to:
  measure a voltage level of a positive terminal of a power source at a tamper input signal of a processor component when a switch is in a first position, the switch connected to a first terminal of a transistor in parallel with the positive terminal of the power source, a second terminal of the transistor connected to a power input of the processor component, and a third terminal of the transistor connected in parallel with the switch and the tamper signal input to the processor component;
  determine a clasp is in a clasped state based on the voltage level measured at the tamper input signal of the processor component;
  measure a reference voltage level at the tamper input signal of the processor component in response to operation of the switch into a second position;
  determine the clasp is in an unclasped state based on the reference voltage level measured at the tamper input signal of the processor component; and
  altering one or more portions of data in a memory communicatively coupled with the processor component in response to determining the clasp is in the unclasped state.

20. The at least one non-transitory computer-readable medium of claim 19, comprising instructions that, in response to being executed by the processor component, cause the processor component to retrieve an identifier from the memory and cooperate with an interface to transmit the identifier via near field communications (NFC) to an initialization device.

21. The at least one non-transitory computer-readable medium of claim 20, comprising instructions that, in response to being executed by the processor component, cause the processor component to receive the data via NFC in response to transmission of the identifier to the initialization device and store the data in the memory.

22. The at least one non-transitory computer-readable medium of claim 21, comprising instructions that, in response to being executed by the processor component, cause the processor component to condition transmission of the data on whether the clasp has changed state from the clasped state to the unclasped state following receipt of the data via NFC and storage of the data within the memory.

23. The at least one non-transitory computer-readable medium of claim 20, comprising instructions that, in response to being executed by the processor component, cause the processor component to cooperate with the interface to transmit an indication of the state of the clasp to the initialization device via NFC.

24. The at least one non-transitory computer-readable medium of claim 19, operation of the clasp from the clasped state to the unclasped state to cause a voltage drop at the power input to the processor component.

25. The at least one non-transitory computer-readable medium of claim 24, operation of the clasp from the clasped state to the unclasped state to cause a voltage change at the third terminal, the voltage change at the third terminal to cause the voltage drop at the power input to the processor component.

* * * * *